US009703510B2

(12) United States Patent
Shibata

(10) Patent No.: US 9,703,510 B2
(45) Date of Patent: Jul. 11, 2017

(54) TERMINAL APPARATUS FOR CAUSING FUNCTION EXECUTING APPARATUS TO EXECUTE FUNCTION AND FUNCTION EXECUTING APPARATUS THEREOF

(71) Applicant: Brother Kogyo Kabushiki Kaisha, Nagoya-shi, Aichi-ken (JP)

(72) Inventor: Hiroshi Shibata, Obu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/082,374

(22) Filed: Mar. 28, 2016

(65) Prior Publication Data

US 2016/0350036 A1 Dec. 1, 2016

(30) Foreign Application Priority Data

May 28, 2015 (JP) .................................. 2015-108483

(51) Int. Cl.
*G06F 3/12* (2006.01)
*H04W 8/00* (2009.01)
(Continued)

(52) U.S. Cl.
CPC ............ *G06F 3/1236* (2013.01); *G06F 3/122* (2013.01); *G06F 3/126* (2013.01); *G06F 3/1292* (2013.01);
(Continued)

(58) Field of Classification Search
None
See application file for complete search history.

(56) References Cited

U.S. PATENT DOCUMENTS

2014/0302847 A1* 10/2014 Yoshida ................ H04W 48/18
455/435.2
2015/0382391 A1 12/2015 Hamachi

FOREIGN PATENT DOCUMENTS

| JP | 2012-175452 A | 9/2012 |
| JP | 2014-160961 A | 9/2014 |
| WO | 2014-129154 A2 | 8/2014 |

OTHER PUBLICATIONS

Wi-Fi Alliance Technical Committee P2P Task Group, "Wi-Fi Peer-to Peer (P2P) Technical Specification", Version 1.1, pp. 1-159, 2010.

(Continued)

*Primary Examiner* — Thomas D Lee
(74) *Attorney, Agent, or Firm* — Banner & Witcoff, Ltd.

(57) ABSTRACT

A terminal apparatus may send a first inquiry signal to two or more function executing apparatuses; receive a first response signal from each of the two or more function executing apparatuses; and determine whether the function executing apparatus is a first type of function executing apparatus or a second type of function executing apparatus based on the first response signal. The terminal apparatus may send a second inquiry signal to each first type of function executing apparatus; and receive a second response signal from each first type of function executing apparatus; select a target function executing apparatus, by using at least one of first information and second information. The terminal apparatus may establish a wireless connection with the target function executing apparatus via the wireless interface; and send an executing instruction to the target function executing apparatus.

18 Claims, 9 Drawing Sheets

(51) Int. Cl.
   *H04L 29/08* (2006.01)
   *H04W 76/02* (2009.01)
   *H04W 4/00* (2009.01)

(52) U.S. Cl.
   CPC ............... *H04L 67/16* (2013.01); *H04W 4/00* (2013.01); *H04W 8/005* (2013.01); *H04W 76/023* (2013.01)

(56) References Cited

OTHER PUBLICATIONS

Wi-Fi Alliance Technical Committee P2P Task Group, "Wi-Fi Peer-to Peer (P2P) Technical Specification", Version 1.5, pp. 1-183, 2014.
Wi-Fi Alliance, "Wi-Fi Peer-to Peer Services (P2Ps) Technical Specification (for Wi-Fi Direct services certification)", Version 1.1, pp. 1-100, 2014.

\* cited by examiner

FIG. 5
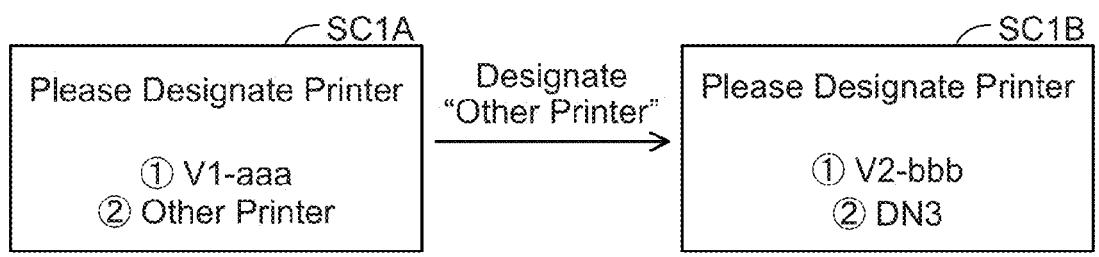
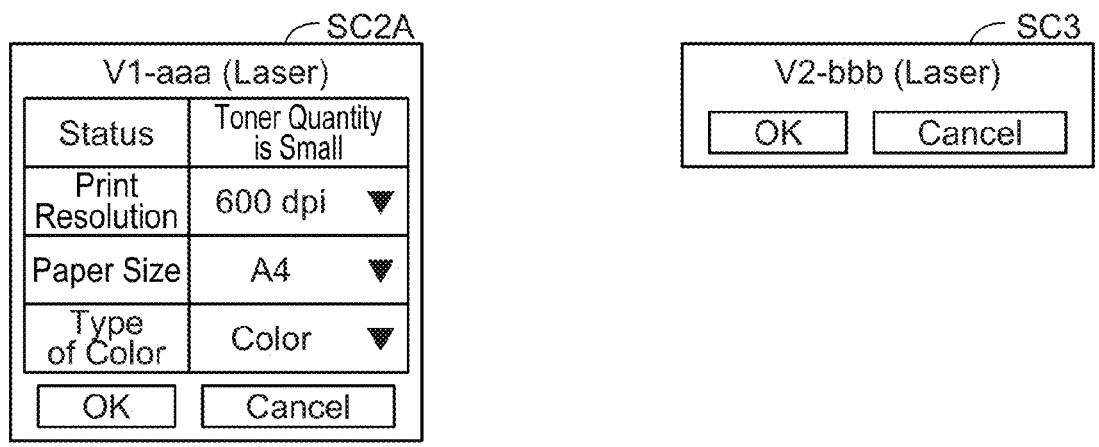
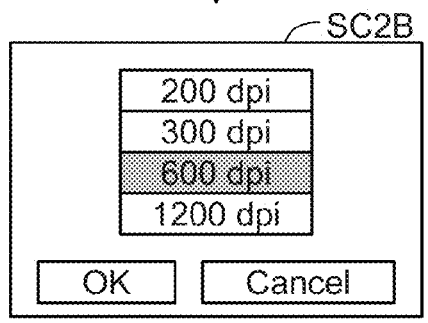

FIG. 8 (Second Embodiment)

TERMINAL APPARATUS FOR CAUSING FUNCTION EXECUTING APPARATUS TO EXECUTE FUNCTION AND FUNCTION EXECUTING APPARATUS THEREOF

CROSS-REFERENCE TO RELATED APPLICATIONS

This application claims priority to Japanese Patent Application No. 2015-108483, filed on May 28, 2015, the entire contents of which are hereby incorporated by reference into the present application.

TECHNICAL FIELD

The present teachings disclose a technique for a terminal apparatus to cause a function executing apparatus to execute a function.

DESCRIPTION OF RELATED ART

Wi-Fi Direct Services (called "WFDS" below) are known, and a scheme called Service Discovery in accordance with the WFDS (called "SD of WFDS" below) is known. Further, a scheme called Service Discovery in accordance with Wi-Fi Direct (called "SD of WFD" below) is known. Before a wireless connection with a printer is established, a terminal apparatus can obtain information related to a print service from a printer by using the SD of WFDS or the SD of WFD. After having established a wireless connection with the printer, the terminal apparatus causes the printer to execute a print function.

SUMMARY

Not all printers necessarily support the SD of WFDS and the SD of WFD. Consequently, if requesting information in accordance with the SD of WFDS from a printer which does not support the SD of WFDS, the terminal apparatus cannot obtain the information from the printer. Further, if requesting information in accordance with the SD of WFD from a printer which does not support the SD of WFD, the terminal apparatus cannot obtain the information from the printer. Consequently, the communication for the terminal apparatus to request the information from the printer is unnecessary.

Further, in general, the types of information that the printer is able to supply to the terminal apparatus in accordance with the SD of WFDS is determined in advance by the Wi-Fi Alliance. The SD of WFDS further also has a scheme capable of supplying, to the terminal apparatus, information unique to the vendor of the printer. That is, the printer can supply the terminal apparatus with not only a predetermined type of information determined by the Wi-Fi Alliance, but also with unique information determined by the vendor. However, even if the terminal apparatus obtains unique information in accordance with the SD of WFDS from a printer supporting the SD of WFDS, the terminal apparatus may not be able to appropriately interpret the information unless provided with a program corresponding to the vendor of the printer. In this case, also, communication between the terminal apparatus and the printer is unnecessary.

Further, the specifications of the SD of WFD are not uniform between each of the vendors of each of the printers. Consequently, even if the terminal apparatus obtains information in accordance with the SD of WFD from the printer supporting the SD of WFD, the terminal apparatus may not be able to appropriately interpret the information unless provided with a program corresponding to the vendor of the printer. In this case, also, communication between the terminal apparatus and the printer is unnecessary.

It is not just the SD of WFDS and SD of WFD schemes where unnecessary communication between the terminal apparatus and the function executing apparatus is not preferred. The present disclosure presents a technique which may prevent execution of unnecessary communication between the terminal apparatus and the function executing apparatus before a wireless connection between the terminal apparatus and the function executing apparatus is established.

One aspect disclosed in the present teachings may be a terminal apparatus comprising: a wireless interface for executing a wireless communication; a processor, and a memory storing computer-readable instructions therein, the computer-readable instructions, when executed by the processor, causing the terminal apparatus to perform: sending, before a wireless connection between the terminal apparatus and a target function executing apparatus via the wireless interface is established, a first inquiry signal to two or more function executing apparatuses; in response to sending the first inquiry signal, receiving two or more first response signals from two or more function executing apparatuses, each of the first response signals including first information related to the function executing apparatus which is a sender of the first response signal; determining, for each of the two or more function executing apparatuses, whether the function executing apparatus is a first type of function executing apparatus or a second type of function executing apparatus based on the first response signal received from the function executing apparatus; sending, before the wireless connection between the terminal apparatus and the target function executing apparatus via the wireless interface is established, a second inquiry signal to the one or more first type of function executing apparatuses, wherein the second inquiry signal is not sent to the one or more second type of function executing apparatuses; in response to sending the second inquiry signal, receiving one or more second response signals from the one or more first type of function executing apparatuses, the second response signal including second information related to a particular function which the first type of function executing apparatus is capable of executing; selecting, before the wireless connection between the terminal apparatus and the target function executing apparatus via the wireless interface is established, the target function executing apparatus from among the two or more function executing apparatuses, by using at least one of two or more first information included in the two or more first response signals and the one or more second information included in the one or more second response signals; establishing the wireless connection with the target function executing apparatus via the wireless interface; and sending an executing instruction to the target function executing apparatus via the wireless interface after the wireless connection with the target function executing apparatus is established, the executing instruction being for causing the target function executing apparatus to execute the particular function.

Another aspect disclosed in the present teachings may be a function executing apparatus comprising: a function executing engine for executing a particular function; a wireless interface for executing a wireless communication; a processor, and a memory storing computer-readable instructions therein, the computer-readable instructions, when executed by the processor, causing the function executing apparatus to perform: receiving, before a wireless connection between a terminal apparatus and the function executing apparatus via the wireless interface is established, a first inquiry signal from the terminal apparatus via the wireless interface; in response to receiving the first inquiry signal, sending a first response signal to the terminal apparatus via the wireless interface, the first response signal including particular information indicating that the function executing apparatus satisfies a predetermined condition; receiving a second inquiry signal from a first type of terminal apparatus via the wireless interface in a case where the terminal apparatus is the first type of terminal apparatus which is capable of obtaining function information related to the particular function from the function executing apparatus which satisfies the predetermined condition, wherein the second inquiry signal is not received from a second type of terminal apparatus, in a case where the terminal apparatus is the second type of terminal apparatus which is not capable of obtaining the function information from the function executing apparatus which satisfies the predetermined condition; in response to receiving the second inquiry signal, sending a second response signal including the function information to the first type of terminal apparatus via the wireless interface; establishing a wireless connection with the first type of terminal apparatus in a case where a trigger signal for establishing the wireless connection is received from the first type of terminal apparatus via the wireless interface; establishing a wireless connection with the second type of terminal apparatus in a case where the trigger signal is received from the second type of terminal apparatus via the wireless interface; receiving a first function executing instruction from the first type of terminal apparatus via the wireless interface after the wireless connection with the first type of terminal apparatus is established; receiving a second function executing instruction from the second type of terminal apparatus via the wireless interface after the wireless connection with the second type of terminal apparatus is established; causing the function executing engine to execute the particular function in a case where the first function executing instruction is received from the first type of terminal apparatus; and causing the function executing engine to execute the particular function in a case where the second function executing instruction is received from the second type of terminal apparatus.

Moreover, a control method, a computer program including computer-readable instructions, and a non-transitory computer-readable storage medium that stores the computer-readable instructions, all for realizing the terminal apparatus, are also novel and useful. Further, a control method, a computer program including computer-readable instructions, and a non-transitory computer-readable storage medium that stores the computer-readable instructions, all for realizing the function executing apparatus, are also novel and useful. Further, a communication system comprising the terminal apparatus and the function executing apparatus is also novel and useful.

BRIEF DESCRIPTION OF THE DRAWINGS

FIG. 5 shows an example of screens displayed by the portable terminal;

EMBODIMENT

Figure 1:
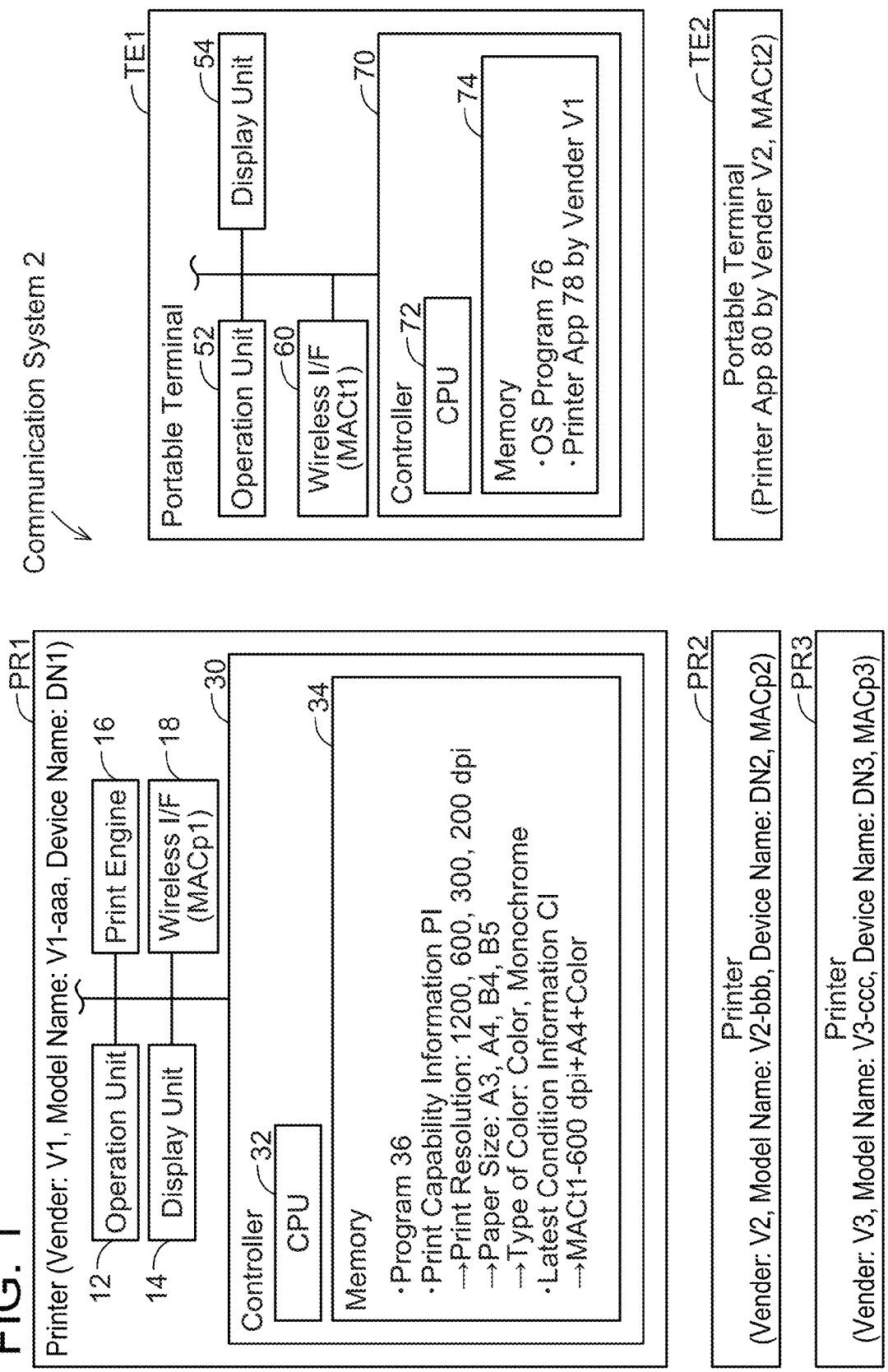
FIG. 1 shows a configuration of a communication system.

First Embodiment (Configuration of Communication System 2; FIG. 1)
As shown in FIG. 1, a communication system 2 comprises a plurality of printers PR1, PR2, PR3, and a plurality of portable terminals TE1, TE2. The printers PR1, etc. and the portable terminals TE1, etc., are capable of executing wireless communication with each other.

(Configuration of Printer PR1)
The printer PR1 is a peripheral apparatus capable of executing a print function (i.e., a peripheral apparatus of the portable terminal TE1, etc.). The printer PR1 is a device produced by a vendor V1, and has a model name "V1-*aaa*" and a device name "DN1". The model name "V1-*aaa*" is a name indicating the type of the printer PR1, which is determined by the vendor V1, and includes the character string "V1" indicating the vendor V1. The device name "DN1" is a name of the printer PR1, and can be determined by a user of the printer PR1.

The printer PR1 comprises an operation unit 12, a display unit 14, a print engine 16, a wireless interface 18, and a controller 30. Each of the units 12 to 30 is connected to a bus wire (reference number omitted). Moreover, below, interface is referred to as "I/F".

The operation unit 12 comprises a plurality of keys. The user can input various instructions to the printer PR1 by operating the operation unit 12. The display unit 14 is a display for displaying various types of information. The display unit 14 functions as a so-called touch panel. That is, the display unit 14 also functions as an operation unit operated by the user. The print engine 16 comprises an ink jet method, laser method, etc. printing mechanism.

The wireless I/F 18 is an I/F for executing a wireless communication in accordance with the Wi-Fi scheme. The Wi-Fi scheme is a wireless communication scheme conforming to the standards developed by the Wi-Fi Alliance, e.g., IEEE (abbreviation of the Institute of Electrical and Electronics Engineers, Inc.) standard 802.11 and standards conforming thereto (e.g., 802.11a, 11b, 11g, 11n, etc.). More specifically, the wireless I/F 18 supports WFD (abbreviation of Wi-Fi Direct (registered trademark)) developed by the Wi-Fi Alliance and, further, supports the Service Discovery scheme of WFD (called "SD of WFD" below). The WFD (further, the SD of WFD) is described in "Wi-Fi Peer-to-Peer (P2P) Technical Specification Version1.5", Wi-Fi Alliance, 2014. Further, the wireless I/F 18 supports WFDS (abbreviation of Wi-Fi Direct Services) developed by the Wi-Fi Alliance and, further, supports the Service Discovery scheme of WFDS (called "SD of WFDS" below). WFDS (further, the SD of WFDS) is described in "Wi-Fi Peer-to-Peer Services (P2Ps) Technical Specification (for Wi-Fi Direct services certification) Version1.1", Wi-Fi Alliance, 2014. Moreover, in the SD of WFDS, the Service Protocol Type is Peer to Peer Services and, in the SD of WFD, the Service Protocol Type is not Peer to Peer Services. Further, a MAC address "MACp1" is assigned to the wireless I/F 18.

The controller 30 comprises a CPU 32 and a memory 34. The CPU 32 executes various processes in accordance with a program 36 stored in the memory 34. The memory 34 is configured by a volatile memory, non-volatile memory, or the like. In addition to the program 36, the memory 34 stores print capability information PI and latest condition information CI.

The print capability information PI is information indicating capability of the printer PR1 to execute a print function, and indicates a plurality of print resolutions (e.g. 1200 dpi, 600 dpi), a plurality of print paper sizes (e.g. A3, A4, etc.), and a plurality of number of colors (e.g. Color indicating color print, Mono indicating monochrome print). The latest condition information CI is information, for each of one or more portable terminals, in which a MAC address (e.g. MACt1) of the portable terminal, and selected condition information included in a latest print executing instruction received from that portable terminal, are associated with each other. The selected condition information is information indicating a print condition selected by the user and, in the example of FIG. 1, includes print resolution "600 dpi", paper size "A4", and number of colors "Color".

(Configuration of Other Printers PR2, PR3)

The hardware configuration of the printers PR2, PR3 is basically the same as the hardware configuration of the printer PR1. The printer PR2 and the printer PR3 are respectively devices produced by a vendor V2 and a vendor V3, who are different from the vendor V1 of the printer PR1. The printer PR2 has a model name "V2-*bbb*" and a device name "DN2" and, further, has a MAC address "MACp2". The printer PR3 has a model name "V3-*ccc*" and a device name "DN3" and, further, has a MAC address "MACp3".

The printers PR2, PR3 support the WFDS (further, the SD of WFDS). However, in the present embodiment, the printers PR2, PR3 support the WFD, but do not support the SD of WFD. That is, the printers PR2, PR3 cannot supply information by using the SD of WFD.

(Configuration of Portable Terminal TE1)

The portable terminal TE1 is a portable terminal device such as a mobile telephone, a smartphone, a notebook PC, a tablet PC, etc. The portable terminal TE1 comprises an operation unit 52, a display unit 54, a wireless I/F 60, and a controller 70. Each of the units 52 to 70 is connected to a bus line (reference number omitted).

The operation unit 52 is configured by a plurality of keys. The user can input various instructions to the portable terminal TE1 by operating the operation unit 52. The display unit 54 is a display for displaying various kinds of information. The display unit 54 functions as a so-called touch panel. That is, the display unit 54 also functions as an operation unit operated by the user. The Wi-Fi I/F 60 is an I/F for executing a wireless communication in accordance with the Wi-Fi scheme. More specifically, the wireless I/F 60 supports the WFD and the WFDS (further, the SD of WFD, the SD of WFDS). A MAC address "MACt1" is assigned to the wireless I/F 60.

The controller 70 comprises a CPU 72 and a memory 74. The CPU 72 executes various processes in accordance with programs 76, 78 stored in the memory 74. The memory 74 is configured by a volatile memory, non-volatile memory, etc. In addition to an OS (abbreviation of Operating System) program 76 for realizing basic processing, the memory 74 stores a printer application (called "printer app" below) 78.

The printer app 78 is an application provided by the vendor V1 of the printer PR1. For example, the printer app 78 may be installed on the portable terminal TE1 from a server (not shown) on the Internet provided by the vendor V1, or may be installed on the portable terminal TE1 from a media shipped together with the printer PR1. The printer app 78 was developed by the vendor V1 with the aim of causing the printer PR1 to execute the print function, but can also cause a printer other than the printer PR1 (e.g. PR2, PR3) to execute the print function.

(Configuration of Other Portable Terminal TE2)

The hardware configuration of the portable terminal TE2 is basically the same as the hardware configuration of the portable terminal TE1. The portable terminal TE2 comprises an application 80 provided by the vendor V2 of the printer PR2. The printer app 80 was developed by the vendor V2 with the aim of causing the printer PR2 to execute the print function, but can also cause a printer other than the printer PR2 (e.g. PR1, PR3) to execute the print function.

The terminal apparatus TE2 supports the WFDS (further, the SD of WFDS). However, in the present embodiment, the terminal apparatus TE2 supports the WFD, but does not support the SD of WFD. That is, the terminal apparatus TE2 cannot request information by using the SD of WFD.

Figure 2:
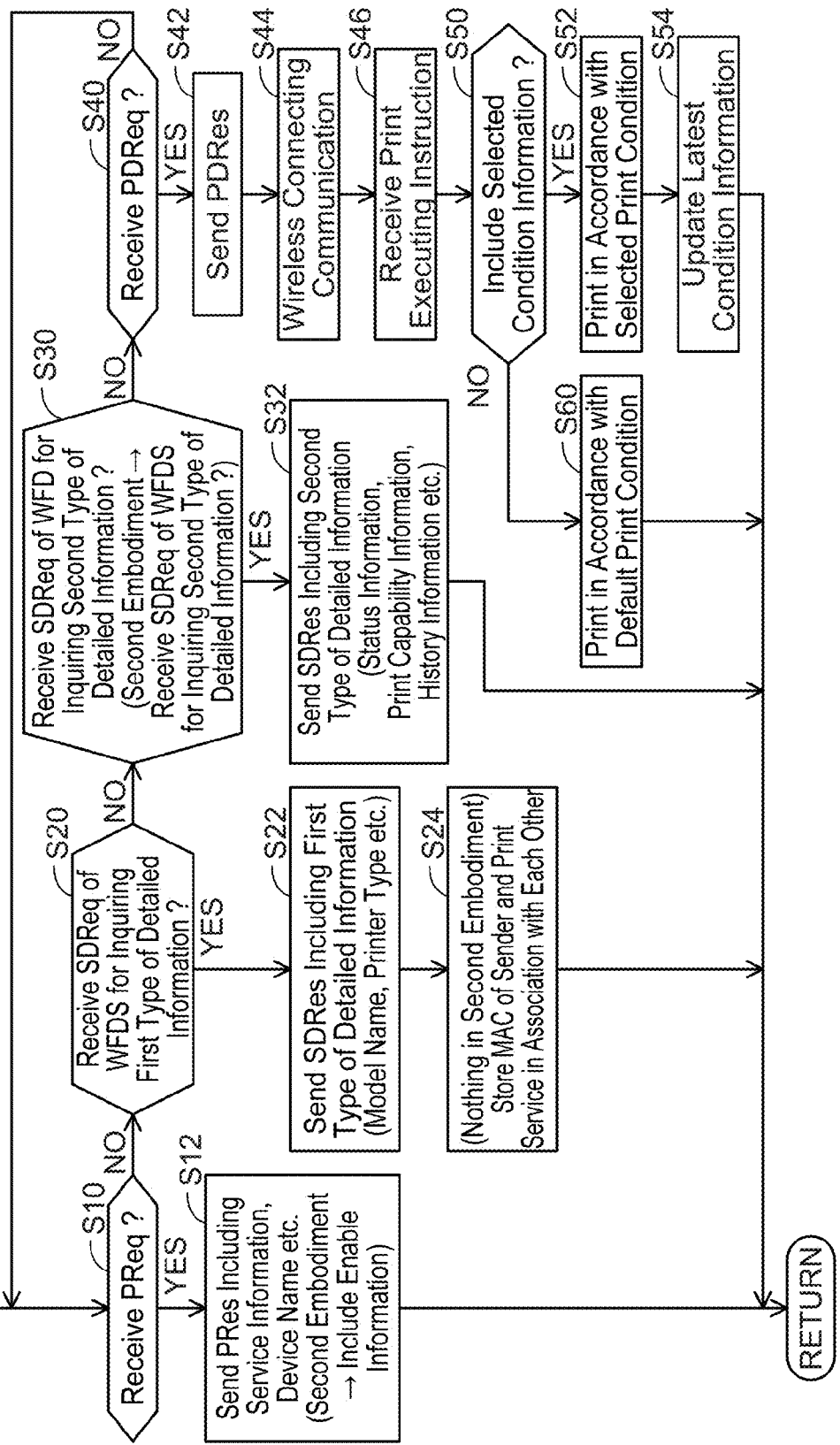
FIG. 2 shows a flowchart of a process executed by a printer.

(Process of Printer PR1; FIG. 2)

Next, a flowchart of a process executed by the CPU 32 of the printer PR1 will be described with reference to FIG. 2. Before a wireless connection is established via the wireless I/F 18, in S10, S20, S30, and S40 the CPU 32 monitors whether a signal has been received from a portable terminal (e.g. TE1, etc.) via the wireless I/F 18. Before a wireless connection is established via the wireless I/F 18, the CPU 32 can execute communication via the wireless I/F 18 by using a network interface layer, without using a communication layer of the internet layer or above the internet layer of the TCP/IP model (i.e., internet layer, transport layer, and application layer). S10, S12, S20, S22, S30, S32, and S40 to S44, below, are communications not using the communication layer of the internet layer or above the internet layer. On the other hand, after having established a wireless connection via the wireless I/F 18, the CPU 32 can execute communication via the wireless I/F 18 using the communication layer of the internet layer of the TCP/IP model or above the internet layer of the TCP/IP model. S46, below, is a communication in which the communication layer of the internet layer or above the internet layer is used.

In S10, the CPU 32 monitors whether a Probe Request signal (called "PReq" below) has been received from the portable terminal. Here, at the time of monitoring, the printer PR1 does not belong to a wireless network in accordance with the WFD (i.e., a wireless network in accordance with the WFD has not been formed). The PReq includes information for inquiring whether the printer PR1 supports a print service. In the case of receiving the PReq from the portable terminal (YES in S10), in S12 the CPU 32 sends a Probe Response signal (called "PRes" below) including service information, the device name "DN1", etc. to the portable terminal. Here, the service information includes information indicating that the printer PR1 supports the print service. When S12 ends, the process returns to the monitoring processes (S10, etc.).

In S20, the CPU 32 monitors whether a Request signal in accordance with the SD of WFDS (called "SDReq of WFDS" below) has been received from the portable terminal. The SDReq of WFDS includes information for inquiring a first type of detailed information related to the print service. In the case of receiving the SDReq of WFDS from the portable terminal (YES in S20), in S22 the CPU 32 sends a Response signal including the first type of detailed information (called "SDRes of WFDS" below) to the portable terminal. Here, the type of the first type of detailed information is predetermined by the Wi-Fi Alliance, and includes the model name "V1-*aaa*", and printer type information, etc. The printer type information is information indicating whether the print engine 16 is ink jet type or laser type.

Next, in S24, the CPU 32 stores, in the memory 34, the MAC address of the sender included in the SDReq of WFDS, and information indicating the print service inquired in the SDReq of WFDS in association with each other. When S24 ends, the process returns to the monitoring processes (S10, etc.).

In S30, the CPU 32 monitors whether a Request signal in accordance with the SD of WFD (called "SDReq of WFD" below) has been received from the portable terminal. The SDReq of WFD includes information for inquiring a second type of detailed information. In the case of receiving the SDReq of WFD from the portable terminal (YES in S30), in S32 the CPU 32 sends a Response signal (called "SDRes of WFD" below) including the second type of detailed information to the portable terminal. Specifically, the CPU 32 specifies, from the memory 34, the print service (see S24) associated with the MAC address of the sender included in the SDReq of WFD, and sends the SDRes of WFD including the second type of detailed information related to the specified print service to the portable terminal. Since the SDReq of WFD does not include information indicating the print service, even if the information in the SDReq of WFD is viewed, the CPU 32 does not know which detailed information related to which service, from among the plurality of services in accordance with the WFD (e.g., print service, display service, SEND service, etc.) should be sent. However, in the present embodiment, the MAC address and the information indicating the print service are associated with each other in S24. Consequently, the printer PR1 can appropriately send the second type of detailed information related to the print service to the portable terminal in response to the SDReq of WFD.

In general, the number of items in the second type of detailed information is greater than the number of items in the first type of detailed information. Further, the second type of detailed information includes information relating to the print service which is more detailed than the first type of detailed information. The type of the second type of detailed information is determined arbitrarily by the vendor V1 of the printer PR1, and includes status information, the print capability information PI (see FIG. 1), history information, etc. The status information is information indicating a current status of the print engine 16 (e.g., standby, sleep, error, etc.). The error status includes, e.g., error indicating print medium jammed, error indicating a residual quantity of a consumable (e.g. ink cartridge) is equal to or below a predetermined quantity, etc. Further, the history information is information associated with the MAC address included in the SDReq of WFD (i.e., the MAC address of the portable terminal of the sender), within the latest condition information CI in the memory 34. When S32 ends, the process returns to the monitoring processes (S10, etc.).

In S40, the CPU 32 monitors whether a Provision Discovery Request signal (called "PDReq" below) has been received from the portable terminal. The PDReq is a trigger signal for establishing a wireless connection in accordance with the WFDS. In the case of receiving the PDReq from the portable terminal (YES in S40), in S42 the CPU 32 sends a Response signal (called "PDRes" below) to the portable terminal.

In S44, the CPU 32 executes communication with the portable terminal of various signals for establishing a wireless connection in accordance with the WFDS. Specifically, the CPU 32 executes communication of a signal related to P2P Group Formation for determining which, of the printer PR1 and the portable terminal, is to become G/O and, further, executes communication of signals for Authentication, Association, 4-Way Handshake, etc. When the communication of the various signals is executed, one of the printer PR1 and the portable terminal becomes the G/O, the other becomes the client, and a wireless connection between the printer PR1 and the portable terminal is established.

In S46, the CPU 32 receives a print executing instruction from the portable terminal by using the wireless connection with the portable terminal. The print executing instruction includes print data representing an image of a print target. The print executing instruction may further include selected condition information. The selected condition information is information indicating the selected print condition (e.g., print resolution "600 dpi", paper size "A4", number of colors "Color") selected by the user of the portable terminal in accordance with the print capability information PI. As will be described in detail later, the print executing instruction received from the portable terminal TE1 comprising the printer app 78 provided by the vendor V1 includes the selected condition information. However, the print executing instruction received from the portable terminal TE2 comprising the printer app 80 provided by the vendor V2 does not include the selected condition information.

In S50, the CPU 32 determines whether the print executing instruction includes the selected condition information. In the case of determining that the print executing instruction includes the selected condition information (YES in S50), in S52 the CPU 32 causes the print engine 16 to execute a print of an image represented by the print data in accordance with the selected print condition indicated by the selected condition information. Specifically, the CPU 32 converts the print data, generating converted data in accordance with the print resolution (e.g. "600 dpi") and number of colors (e.g. "Color") in the selected print condition. Then, the CPU 32 notifies the print engine 16 of the paper size (e.g. "A4") in the selected print condition, and supplies the converted data to the print engine 16. Thereby, the print engine 16 can execute a print of the image in accordance with the selected print condition.

Next, in S54, the CPU 32 updates the latest condition information CI in the memory 34. Specifically, the CPU 32 stores new selected condition information included in the print executing instruction in the memory 34 instead of the old selected condition information associated with the MAC address which matches the MAC address of the portable terminal included in the print executing instruction. When S54 ends, the process returns to the monitoring processes (S10, etc.).

Further, in the case of determining that the print executing instruction does not include the selected condition information (NO in S50), in S60 the CPU 32 causes the print engine 16 to execute a print of the image represented by the print data in accordance with a predetermined default print condition in the printer PR1. Specifically, the CPU 32 converts the print data, generating converted data in accordance with a predetermined print resolution (e.g. "100 dpi") and a predetermined number of colors (e.g. "monochrome print"). Then, the CPU 32 notifies the print engine 16 of the predetermined paper size (e.g. "A4"), and supplies the converted data to the print engine 16. Thereby, the print engine 16 can execute a print of the image in accordance with the predetermined print condition. When S60 ends, the process returns to the monitoring processes (S10, etc.).

The other printers PR2, PR3, like the printer PR1, are capable of executing the process of FIG. 2. However, in S22, the printer PR2 sends an SDRes including the model name "V2-*bbb*" of the printer PR2, whereas the printer PR3 sends an SDRes which does not include a model name "V3-*bbb*" of the printer PR3. Further, since the printers PR2, PR3 do not support the SD of WFD, the processes of S30 and S32 are not executed, and an SDReq of WFD is not received from any portable terminal. Further, after S46 ends, the printers PR2, PR3 execute S60 without executing S50 to S54.

Figure 3:
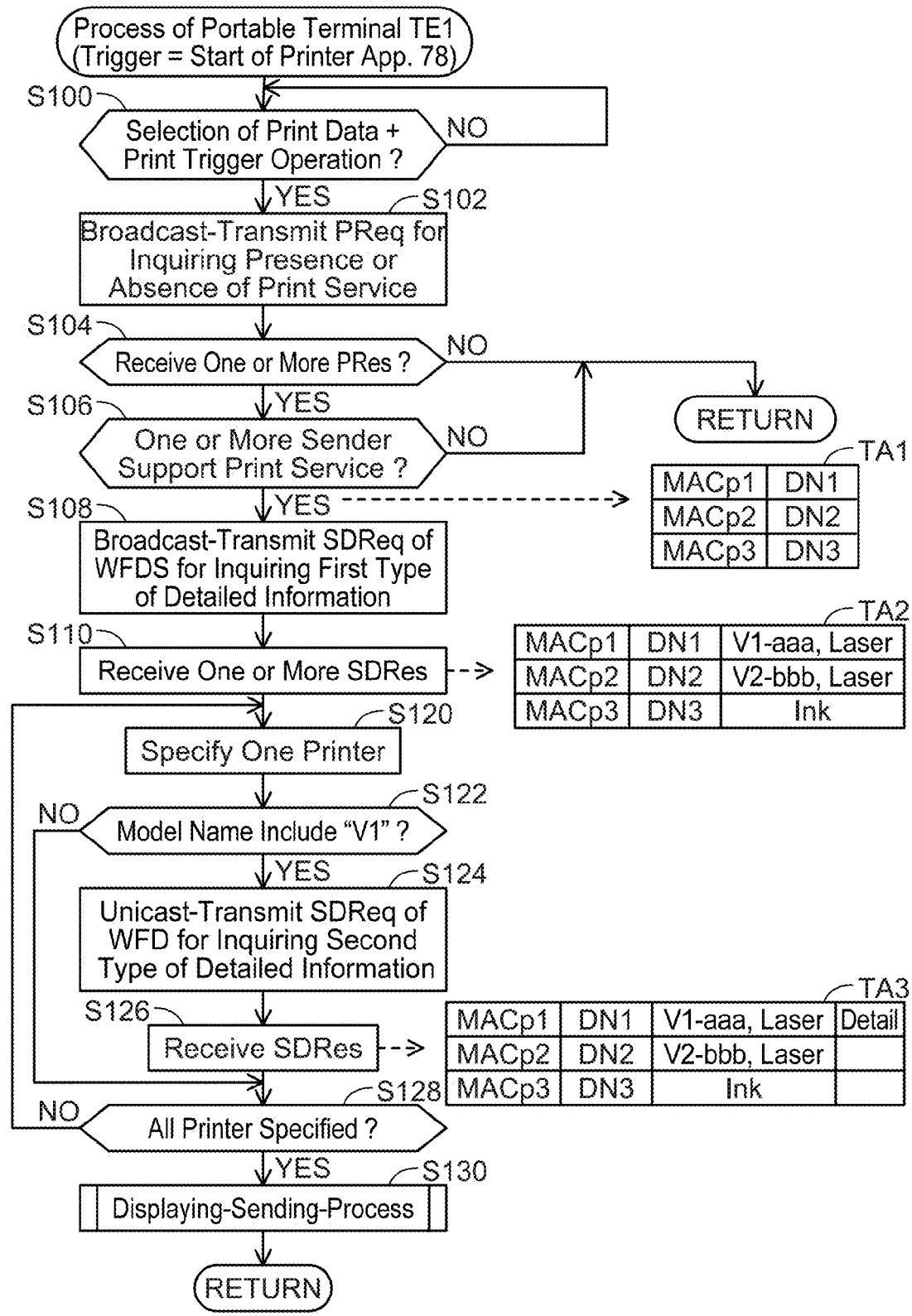
FIG. 3 shows a flowchart of a process executed by a portable terminal.
Figure 4:
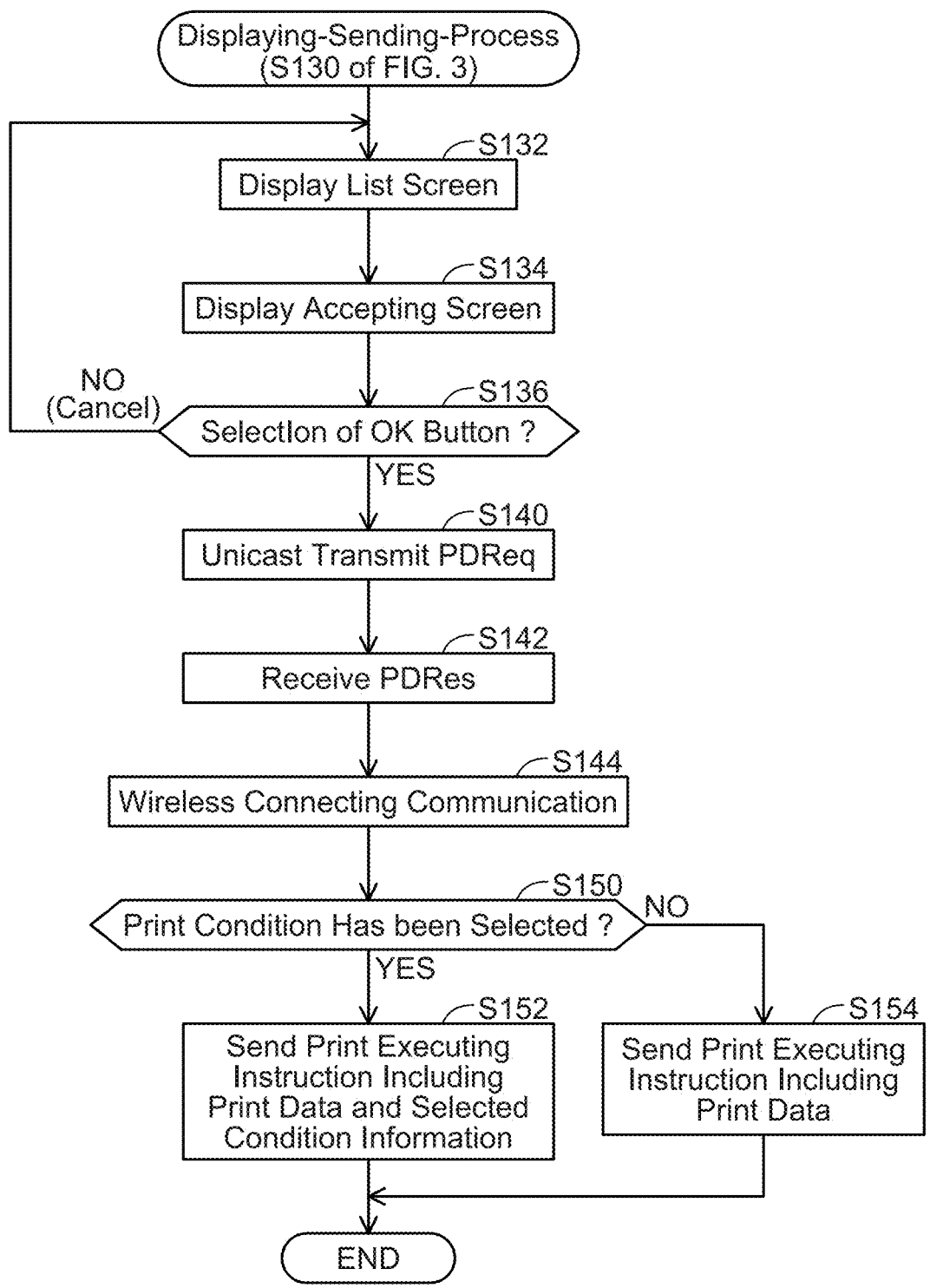
FIG. 4 shows a flowchart of a displaying-sending process.

(Process of Portable Terminal TE1; FIG. 3 and FIG. 4)

Next, a flowchart of a process executed by the CPU 72 of the portable terminal TE1 will be described with reference to FIG. 3 and FIG. 4. In a case where an operation for starting the printer app 78 is executed by the user, the CPU 72 starts the process of FIG. 3. Here, the terminal apparatus TE1 does not belong to a wireless network in accordance with the WFD (i.e., a wireless network in accordance with the WFD has not been formed). Before a wireless connection is established via the wireless I/F 60, the CPU 72 can execute communication via the wireless I/F 60 by using the network interface layer without using a communication layer of the internet layer of the TCP/IP model and above the internet layer of the TCP/IP model. S102, S104, S108, S110, S124, S126 of FIG. 3, and S140 to S144 of FIG. 4, below, are communications in which a communication layer of the internet layer or above the internet layer is not used. On the other hand, after having established a wireless connection via the wireless I/F 60, the CPU 72 can execute communication via the wireless I/F 60 by using the communication layer of the internet layer of the TCP/IP model or above the internet layer of the TCP/IP model. S152 and S154 of FIG. 4, below, are communications in which the communication layer of the internet layer or above the internet layer is used.

In S100, the CPU 72 monitors whether a predetermined operation has been executed by the user. The predetermined operation includes an operation for selecting print data representing an image of a print target from among the plurality of data stored in the memory 74 of the portable terminal TE1, and an operation for selecting a button indicating a print trigger from a screen displayed on the display unit 54. In the case where the predetermined operation is executed by the user (YES in S100), the CPU 72 proceeds to S102.

In S102, the CPU 72 broadcast-transmits a PReq including information for inquiring whether the print service is supported. Broadcast-transmission means sending a signal in which a MAC address of a destination is not specified.

In S104, the CPU 72 determines whether one or more PRes (see S12 of FIG. 2) have been received from one or more devices (e.g. PR1, etc.) until a predetermined time has elapsed since sending the PReq. In a case where one or more PRes have been received, the CPU 72 determines YES in S104, and proceeds to S106. On the other hand, in a case where not even one PRes has been received, the CPU 72 determines NO in S104, and returns to S100.

In S106, the CPU 72 determines whether at least one device, from among the one or more devices that are the senders of the one or more PRes, supports the print service. In a case where at least one PRes (called "target PRes" below) including information indicating the print service exists among the one or more PRes, the CPU 72 determines YES in S106, and proceeds to S108. Here, the target PRes includes not only the information indicating the print service, but also the device name (see S12 of FIG. 2) of the sender (i.e., printer). Consequently, the CPU 72 can store the MAC address of the sender included in the target PRes, and the device name of the sender in association with each other. This is shown in table TA1. In the table TA1, the MAC address and device name are associated for each of the three printers PR1 to PR3.

On the other hand, in a case where not even one target PRes exists in the one or more PRes, the CPU 72 determines NO in S106, and returns to S100. In the case where NO is determined in S104 or S106, i.e., in a case where not even one printer exists in the vicinity of the portable terminal TE1, subsequent processes are not executed, and consequently the processing load of the portable terminal TE1 can be reduced.

In S108, the CPU 72 broadcast-transmits the SDReq of WFDS including information for inquiring the first type of detailed information. However, in a modification, since the CPU 72 knows the MAC addresses of the printers PR1 to PR3 (see the table TA1), the CPU 72 may unicast-transmit or multicast-transmit the SDReq of WFDS. Unicast transmission and multicast transmission mean sending a signal in which the MAC address of the destination is specified. The first type of detailed information is information of a predetermined type determined in advance by the Wi-Fi Alliance. The printer app 78 is configured to be able to interpret the information of the predetermined type. Consequently, the portable terminal TE1 broadcast-transmits the SDReq of WFDS, and can interpret the first type of detailed information in the SDRes even if the portable terminal TE1 receives the SDRes of WFDS from any of the printers PR1 to PR3.

In S110, the CPU 72 receives the one or more SDRes of WFDS from the one or more printers (see S22 of FIG. 2). Consequently, the CPU 72 can add information, in which the MAC address of the sender included in the SDRes of WFDS, and the first type of detailed information included in the SDRes of WFDS, are associated with each other, to the table TA1. As a result, e.g., table TA2 is generated. In the table TA2, the MAC address and the first type of detailed information are associated with each other for each of the three printers PR1 to PR3. The first type of detailed information corresponding to each of the printers PR1, PR2 includes the model name and the printer type information (i.e., Laser) (S22 of FIG. 2). On the other hand, the first type of detailed information corresponding to the printer PR3 includes the printer type information (i.e., Ink), but does not include model name.

Next, in S120, the CPU 72 specifies one printer by specifying one MAC address from the table TA2. In S122, the CPU 72 first determines whether a model name is associated with the specified MAC address. In a case of determining that a model name is associated, the CPU 72 determines whether the model name includes the character string "V1". That is, in S122, the CPU 72 determines whether the specified printer is a printer produced by the predetermined vendor V1. In other words, the CPU 72 determines whether the vendor of the specified printer and the vendor of the printer app 78 for executing the processes of FIG. 3, are identical. In the case of determining that the model name includes the character string "V1", the CPU 72 determines YES in S122, and proceeds to S124. On the other hand, in a case of determining that the model name is not associated, or of determining that the model name does not include the character string "V1", the CPU 72 determines NO in S122, skips S124 and S126, and proceeds to S128. For example, in a case where the specified printer is the printer PR1 (i.e., "MACp1"), the model name "V1-*aaa*"

includes the character string "V1", and consequently YES is determined in S122. Further, e.g., in a case where the specified printer is the printer PR2 (i.e., "MACp2"), the model name "V2-*bbb*" does not include the character string "V1", and consequently NO is determined in S122. Further, e.g., in a case where the specified printer is the printer PR3 (i.e., "MACp3"), a model name is not associated, and consequently NO is determined in S122.

In S124, the CPU 72 unicast-transmits, to the printer PR1, an SDReq of WFD including information for inquiring the second type of detailed information. In S126, the CPU 72 receives the SDRes of WFD from the printer PR1 (see S32 of FIG. 2). Consequently, the CPU 72 can add information in which the MAC address of the sender "MACp1" included in the SDRes of WFD, and the second type of detailed information included in the SDRes of WFD, are associated with each other, to the table TA2. As a result, e.g., table TA3 is generated. The second type of detailed information (simply indicated as "detail") is associated with the MACp1 in the table TA3.

In S128, the CPU 72 determines whether all the MAC addresses (i.e., all the printers) have been specified from the table TA2. In the case of determining that all the printers have been specified (YES in S128), the CPU 72 proceeds to S130, and executes a displaying-sending process (see FIG. 4). When S130 ends, the process returns to S100. On the other hand, in the case of determining that not all the printers have been specified (NO in S128), the CPU 72 returns to S120, and specifies another printer. Moreover, in a case where the printer PR2 or PR3 is specified, NO is determined in S122, and consequently S124 and S126 are not executed. Consequently, the second type of detailed information is not associated with the MACp2 and MACp3 in the table TA3.

(Displaying-Sending Process; FIG. 4)

Next, the contents of the displaying-sending process executed in S130 of FIG. 3 will be described with reference to FIG. 4. In S132, the CPU 72 causes the display unit 54 to display a list screen SC1A of FIG. 5. The CPU 72 causes the list screen SC1A to display the model name of the printer PR1 associated with the second type of detailed information in the table TA3 of FIG. 3, but does not cause the list screen SC1A to display the model name or device name of the printers PR2, PR3 which are not associated with the second type of detailed information. The list screen SC1A further includes a character string "other printer" corresponding to each of the printers PR2, PR3 other than the printer PR1. Thus, the CPU 72 causes the list screen SC1A to display the printer PR1 more preferentially than the printers PR2, PR3. Thereby, it is possible to increase the likelihood of the printer PR1 being specified by the user in the list screen SC1A. As a result, as will be described in detail later, in a case where the printer PR1 is designated by the user, the status information can be provided to the user, and the user can be caused to select the print condition.

In a case where "other printer" is designated by the user in the list screen SC1A, the CPU 72 causes the display unit 54 to display a list screen SC1B of FIG. 5. The model name or device name of the printers PR2, PR3 are written in the list screen SC1B. For example, since the model name "V2-*bbb*" of the printer PR2 is written in the table TA3, the list screen SC1B includes the model name "V2-*bbb*". Further, since the model name of the printer PR3 is not written in the table TA3, the list screen SC1B includes the device name "DN3". When one printer (i.e., model name or device name) is designated by the user in the list screen SC1A or SC1B, the process proceeds to S134. Below, the printer specified here is called "designated printer".

In S134, the CPU 72 causes the display unit 54 to display an accepting screen. Reference number SC2A and reference number SC3 of FIG. 5 are examples, respectively, of an accepting screen in the case where the designated printer is the printer PR1, PR2. The accepting screens SC2A, SC3 each include printer information related to the designated printer, an OK button, and a cancel button. The printer information includes at least the model name or device name of the designated printer, and the printer type information (i.e., "Laser" or "Ink") of the designated printer. Since the printer type information is displayed, the user can determine, based on the printer type information, whether to cause the designated printer to execute a print.

Further, in a case where the second type of detailed information has been obtained from the designated printer, the printer information includes various types of information in accordance with the second type of detailed information. For example, as shown in the table TA3 of FIG. 3, the second type of detailed information is associated with the MACp1 of the printer PR1. Consequently, in the case where the designated printer is the printer PR1, the printer information in the accepting screen SC2A includes a character string indicating the status information in the second type of detailed information (e.g. "Residual Quantity of Toner Low"), and a character string for selecting the print condition. Since the character string indicating the status information is displayed, the user can determine, based on the status information, whether to cause the designated printer (i.e., the printer PR1) to execute a print. Since the character string for selecting the print condition is displayed, the user can select the desired print condition for causing the designated printer (i.e., the printer PR1) to execute a print.

The character string for selecting the print condition is displayed as follows. The CPU 72 causes the accepting screen SC2A to be displayed which, from among the print capability information PI in the second type of detailed information, includes as initial display information the print condition (e.g. "600 dpi", "A4", "Color") indicated by the history information in the second type of detailed information. In other words, the CPU 72 causes the print condition indicated by the history information to be displayed more preferentially than other print conditions. Since the print condition selected the last time by the user is displayed more preferentially, the user can easily select the same print condition as the last time. Then, the CPU 72 causes the accepting screen SC2A to be displayed in a manner allowing the print conditions within the range of the print capability information PI to be changed. For example, in a case where a button corresponding to print resolution (i.e., a button indicating a downward triangle) is selected in the accepting screen SC2A, the CPU 72 causes the display unit 54 to display, instead of the accepting screen SC2A, an accepting screen SC2B indicating four print resolutions included in the print capability information PI. Then, in a case where one print resolution is selected in the accepting screen SC2B, the CPU 72 again causes the display unit 54 to display the accepting screen SC2A indicating the selected resolution.

Further, as shown in the table TA3 of FIG. 3, the second type of detailed information is not associated with the MACp2 of the printer PR2. Consequently, in the case where the designated printer is the printer PR2, the printer information in the accepting screen SC3 does not include a character string indicating the status information and a character string for selecting the print condition. When the OK button or cancel button is selected by the user in the accepting screen SC2A, SC3, etc., the process proceeds to S136.

In S136, the CPU 72 determines whether the OK button or the cancel button was selected by the user. In a case where the OK button was selected, the CPU 72 determines YES in S136, and proceeds to S140 and, in a case where the cancel button was selected, the CPU 72 determines NO in S136, and returns to S132. In response to accepting selection of the OK button from the user, the CPU 72 selects a printer (i.e., the designated printer) having the model name or device name in the accepting screen selected by the OK button. Below, the printer selected here is called "selected printer". Further, in response to accepting selection of the OK button in the accepting screen SC2A from the user, the CPU 72 selects the print condition in the accepting screen selected by the OK button. Below, the print condition selected here is called "selected print condition". Thus, in the present embodiment, the CPU 72 can select the print condition before a wireless connection with the printer is established (i.e., before using a communication of the internet layer or above the internet layer of the TCP/IP model).

In S140, the CPU 72 unicast-transmits a PDReq to the selected printer (see YES in S40 of FIG. 2). In S142, the CPU 72 receives a PDRes from the selected printer (see S42 of FIG. 2).

S144 is the same as S44 of FIG. 2, except that the execution subject is not the CPU 32 of the printer PR1, but the CPU 72 of the portable terminal TE1. When S144 is executed, a wireless connection between the portable terminal TE1 and the selected printer is established.

In S150, the CPU 72 determines whether the print condition has been selected by the user. For example, in the case where the selected printer is the printer PR1, the print condition has been selected in the accepting screen SC2A, SC2B, and consequently, the CPU 72 determines YES in S150, and proceeds to S152. Further, e.g., in the case where the selected printer is the printer PR2 (or PR3), the print condition has not been selected in the accepting screen SC3, and consequently the CPU 72 determines NO in S150, and proceeds to S154.

In S152, the CPU 72 sends a print executing instruction to the selected printer PR1 by using the wireless connection with the selected printer (see S46 of FIG. 2). The print executing instruction includes the print data selected in S100 of FIG. 3, and the selected condition information indicating the selected print condition. As a result, the printer PR1 can be caused to execute a print in accordance with the selected print condition (see S52 of FIG. 2).

On the other hand, in S154, the CPU 72 sends a print executing instruction to the selected printer PR2 (or PR3) by using the wireless connection with the selected printer (see S46 of FIG. 2). The print executing instruction includes the print data selected in S100 of FIG. 3, but does not include condition information indicating the print condition. As a result, it is possible to cause the selected printer to execute a print in accordance with the predetermined default print condition (see S60 of FIG. 2). When S152 or S154 ends, the process of FIG. 4 ends.

In the same way as the portable terminal TE1, the portable terminal TE2 is capable of executing the processes of FIG. 3 and FIG. 4. However, in the present embodiment, the portable terminal TE2 does not support the SD of WFDS. That is, the portable terminal TE2 does not execute S120 to S128 of FIG. 3, and does not obtain the second type of detailed information from any printer. Therefore, in S134 of FIG. 4, the portable terminal TE2 does not display an accepting screen (e.g. SC2A) including printer information in accordance with the second type of detailed information.

Further, after S144 has ended, the portable terminal TE2 executes S154 without executing S150 and S152.

Figure 6:
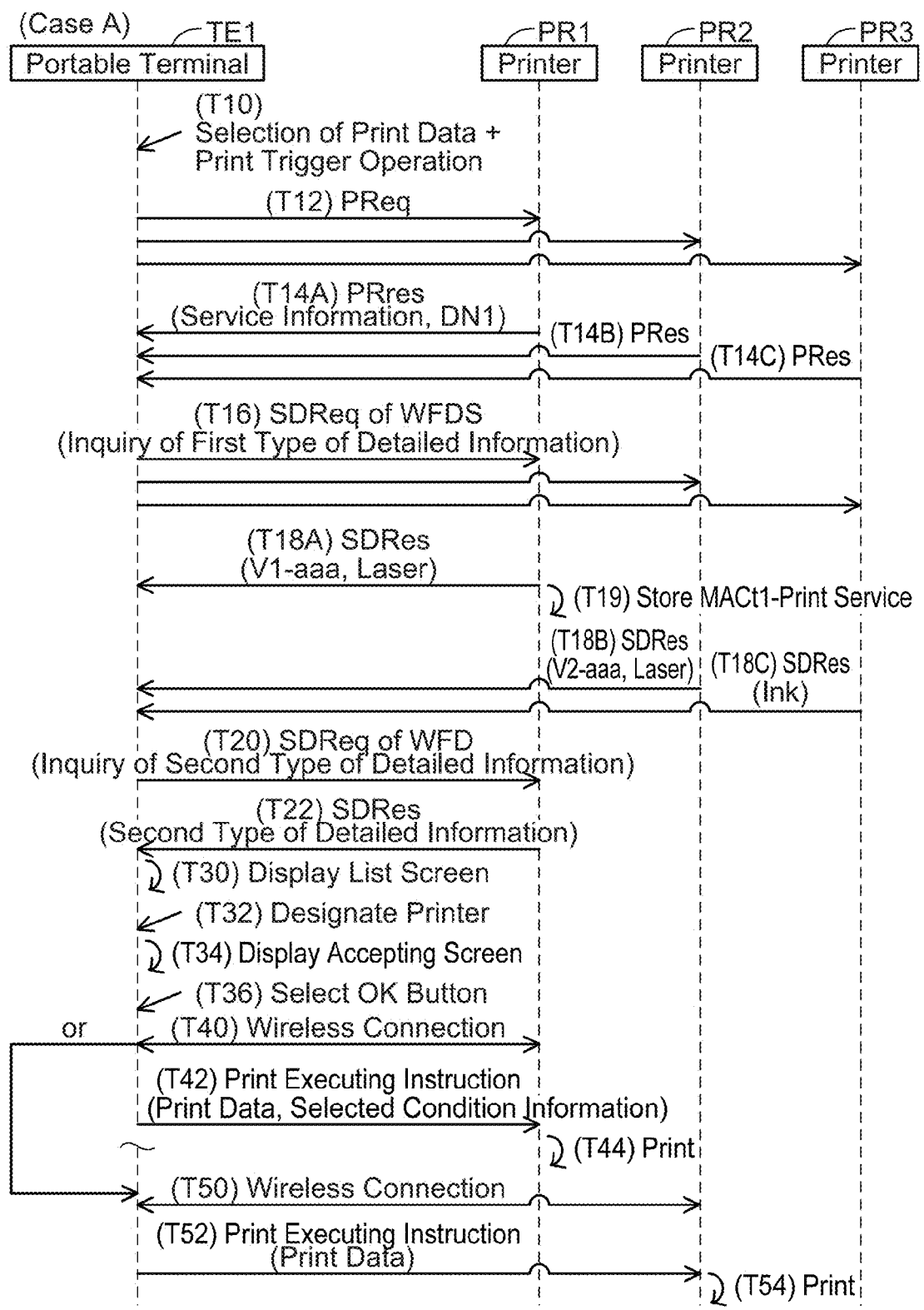
FIG. 6 shows a sequence view of a case A in which the portable terminal causes the printer to execute a print function.

(Case A; FIG. 6)

Next, a case A in which the portable terminal TE1 causes the printer PR1 or PR2 to execute a print will be described with reference to FIG. 6. In T10, a selection of print data and a print trigger operation are executed in the portable terminal TE1 (YES in S100 of FIG. 3). In this case, in T12, the portable terminal TE1 broadcast-transmits a PReq including information for inquiring whether the print service is supported (S102).

In the case of receiving the PReq from the portable terminal TE1 (YES in S10 of FIG. 2), in T14A the printer PR1 sends a PRes to the portable terminal TE1 (S12). The PRes of T14A includes the service information indicating that the print service is supported, and the device name "DN1" of the printer PR. Similarly, in T14B and T14C, each of the printers PR2, PR3 send PRes including the service information and device name to the portable terminal TE1 (S12).

In T16, the portable terminal TE1 broadcast-transmits an SDReq of WFDS including information for inquiring the first type of detailed information (S108 of FIG. 3).

In the case of receiving the SDReq of WFDS from the portable terminal TE1 (YES in S20 of FIG. 2), in T18A the printer PR1 sends an SDRes of WFDS including the first type of detailed information to the portable terminal TE1 (S22). The first type of detailed information of T18A includes the model name "V1-*aaa*" and the printer type information "Laser". In T19, the printer PR1 further stores the MACt1 of the portable terminal TE1 and the character string "Print Service" in association with each other (S24). Similarly, in T18B, T18C, the printers PR2 and PR3 send SDRes including the first type of detailed information to the portable terminal TE1 (S22). The first type of detailed information of T18B includes the model name "V2-*bbb*" and the printer type information "Laser". The first type of detailed information of T18C does not include a model name, and includes the printer type information "Ink". Each of the printers PR2, PR3 does not execute processing corresponding to a storage process of T19.

In T20, the portable terminal TE1 unicast-transmits an SDReq of WFD including information for inquiring the second type of detailed information to the printer PR1 (S120 of FIG. 3, YES in S122, S124). However, the portable terminal TE1 does not send an SDReq of WFD to the printers PR2, PR3 (S120 of FIG. 3, NO in S122).

In the case of receiving the SDReq of WFD from the portable terminal TE1 (YES in S30 of FIG. 2), in T22 the printer PR1 sends an SDRes of WFD including the second type of detailed information to the portable terminal TE1 (S32). The second type of detailed information includes the status information, the print capability information PI, and the history information.

In T30, the portable terminal TE1 displays the list screen (S132 of FIG. 4) and, in T32, accepts designation of the printer from the user. Next, in T34, the portable terminal TE1 displays the accepting screen (S134) and, in T36, accepts selection of the OK button from the user.

For example, in the case where the OK button was selected in T36 after the printer PR1 was designated in T32, i.e., in the case where the printer PR1 was selected by the user, in T40 the portable terminal TE1 establishes a wireless connection with the printer PR1 (S140 to S144 of FIG. 4). Then, in T42, the portable terminal TE1 sends the print executing instruction including the print data and the selected condition information to the printer PR1 (YES in S150, S152). As a result, in T44, the printer PR1 executes a print of an image represented by the print data in accordance with the selected print condition indicated by the selected condition information (YES in S50 of FIG. 2, S52, S54).

Further, e.g., in the case where the OK button was selected in T36 after the printer PR2 was designated in T32, i.e., in the case where the printer PR2 was selected by the user, in T50, the portable terminal TE1 establishes a wireless connection with the printer PR2 (S140 to S144 of FIG. 4). Then, in T52, the portable terminal TE1 sends a print executing instruction which does not include the condition information and includes the print data to the printer PR2 (NO in S150, S154). As a result, in T54, the printer PR2 executes a print of an image represented by the print data in accordance with the predetermined default print condition (NO in S50 of FIG. 2, S60).

As shown in case A, since the portable terminal TE1 sends an SDReq of WFD (T20) to the printer PR1 produced by the vendor V1 before the wireless connection with the printer is established, the portable terminal TE1 can appropriately obtain the second type of detailed information from the printer PR2. Further, the portable terminal TE1 does not send an SDReq of WFD to the printers PR2, PR3 produced by the vendors V2, V3 who are different from the vendor V1, before the wireless connection with the printers is established. This is because, due to not supporting the SD of WFD, the printers PR2, PR3 cannot send an SDRes even if receiving an SDReq of WFD. Therefore, it is possible to prevent execution of unnecessary communication between the portable terminal TE1 and each of the printers PR2, PR3 before a wireless connection between the portable terminal TE1 and the printers is established.

Moreover, even if the printers PR2, PR3 support the SD of WFD, the portable terminal TE1 does not send an SDReq of WFD to the printers PR2, PR3. This is because, even if the second type of detailed information is obtained in accordance with the SD of WFD from the printer PR2 (or PR3) produced by the vendor V2 (or V3), who is different from the vendor V1, the portable terminal TE1 cannot interpret the second type of detailed information in accordance with the printer app 78 because the specifications of the SD of WFD are not uniform between the vendors V1 to V3. Therefore, it is possible to prevent execution of unnecessary communication between the portable terminal TE1 and the printers PR2, PR3 before a wireless connection between the portable terminal TE1 and the printers is established.

Further, it is assumed that the following configuration known from the prior art is adopted: the user of the portable terminal TE1 executes an operation on the printer PR1 for establishing a wireless connection with the portable terminal TE1, causing a wireless connection between the portable terminal TE1 and the printer PR1 to be established. Then, the portable terminal TE1 obtains the second type of detailed information (the status information, print capability information, etc.) from the printer PR1 by using, e.g., SNMP (abbreviation of Simple Network Management Protocol), and displays the second type of detailed information. If there is no problem in confirming the status of the printer PR1, the user selects the print condition. As a result, the portable terminal TE1 sends the print executing instruction including the selected condition information to the printer PR1 by using the wireless connection. However, if there is a problem in the status of the printer PR1, or if a desired print condition is not present in the print capability of the printer PR1, the user does not cause the printer PR1 to execute a print. In this case, a wireless connection between the portable terminal TE1 and the printer PR1 is established regardless of the printer PR1 not being caused to execute a print. That is, according to the above configuration, an unnecessary wireless connection between the portable terminal TE1 and the printer PR1 may be established. By contrast, in the present embodiment, before a wireless connection with the printer is established, the portable terminal TE1 displays the accepting screen SC2A in accordance with the second type of detailed information obtained from the printer PR1, and establishes a wireless connection with the printer PR1 in the case where selection of the printer PR1 from the user is accepted. That is, the portable terminal TE1 establishes a wireless connection with the printer PR1 in a case where the user has confirmed the status and print capability of the printer PR1 and selected the printer PR1. Consequently, it does not occur that the portable terminal TE1 establishes a wireless connection with the printer PR1 despite not causing the printer PR1 to execute a print. It is possible to prevent establishment of an unnecessary wireless connection between the portable terminal TE1 and the printer PR1.

Figure 7:
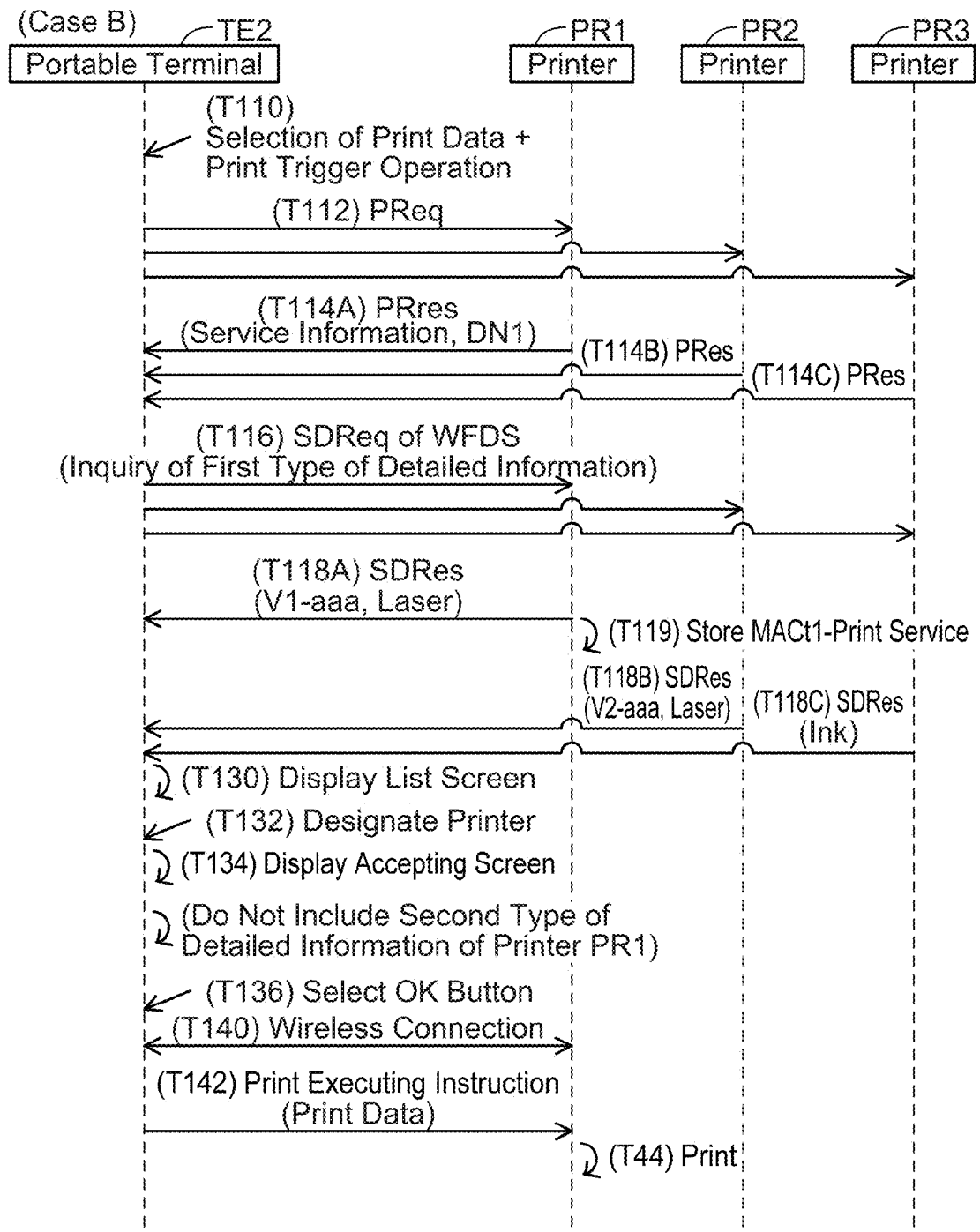
FIG. 7 shows a sequence view of a case B in which the portable terminal causes the printer to execute a print function.

(Case B; FIG. 7)

Next, a case B in which the portable terminal TE2 causes the printer PR1 to execute a print will be described with reference to FIG. 7. T110 to T119 are the same as T10 to T19 of FIG. 6 except for the point that the portable terminal TE2 executes processes rather than the portable terminal TE1. However, in T119, the printer PR1 stores a MACt2 of the portable terminal TE2, not the MACt1 of the portable terminal TE1.

Since the portable terminal TE2 does not support the SD of WFD, the portable terminal TE2 does not send an SDReq of WFD. Then, in T130, the portable terminal TE2 displays a list screen (S132 of FIG. 4) and, in T132, accepts designation of the printer PR1 from the user. Next, in T134, the portable terminal TE2 displays the accepting screen (S134) and, in T136, accepts selection of the OK button from the user. Here, since the second type of detailed information has not been obtained from the printer PR1, in T134 the portable terminal TE2 displays an accepting screen which does not include printer information (e.g., the character string indicating status, the character string for selecting the print condition) in accordance with the second type of detailed information.

Next, in T140, the portable terminal TE2 establishes a wireless connection with the printer PR1 (S140 to S144 of FIG. 4) and, in T142, sends a print executing instruction which does not include the condition information and which includes the print data, to the printer PR1 (S154). As a result, in T144, the printer PR1 executes a print of an image represented by the print data in accordance with the predetermined default print condition (NO in S50 of FIG. 2, S60).

As shown in case A of FIG. 6, before a wireless connection with the portable terminal TE1 is established, the printer PR1 sequentially receives the SDReq of WFDS and the SDReq of WFD from the portable terminal TE1 (T16, T20), and sequentially sends each of SDRes to the portable terminal TE1 (T18A, T22). Then, after the wireless connection with the portable terminal TE1 has been established, in the case of receiving the print executing instruction from the portable terminal TE1 (T42), the printer PR1 executes a print in accordance with the selected print condition (T44). Further, as shown in case B of FIG. 7, before a wireless connection with the portable terminal TE2 is established, the printer PR1 receives the SDReq of WFDS from the portable terminal TE2 (T116), and sends an SDRes to the portable terminal TE2 (T118A). However, the printer PR1 does not receive an SDReq of WFD from the portable terminal TE2.

This is because the portable terminal TE2 does not support the SD of WFD. Then, after the wireless connection with the portable terminal TE2 has been established, in the case of receiving the print executing instruction from the portable terminal TE2 (T142), the printer PR1 executes a print in accordance with the predetermined default print condition (T144). Thus, the printer PR1 appropriately executes a communication with either the portable terminal TE1 comprising the printer app 78 provided by the vendor V1 of the printer PR1, or with the portable terminal TE2 comprising the printer app 80 provided by the vendor V2 who is different from the vendor V1, and can appropriately execute the print function.

(Correspondence Relationship)

The portable terminal TE1, the printers PR1 to PR3 are an example of "terminal apparatus", "function executing apparatus", respectively. The printer PR1, the printer PR2 (or PR3) are an example of "first type of function executing apparatus", "second type of function executing apparatus", respectively. The portable terminal TE1 and the portable terminal TE2 are an example of "first type of terminal apparatus", "second type of terminal apparatus", respectively. The print function is an example of "particular function".

The PReq, PRes, SDReq of WFDS, SDRes of WFDS, SDReq of WFD, SDRes of WFD, and SDReq are an example of "third inquiry signal", "third response signal", "first inquiry signal", "first response signal", "second inquiry signal", "second response signal" and "trigger signal", respectively. The print executing instruction is an example of "function executing instruction (or first and second function executing instruction)". The first type of detailed information is an example of "first information". The second type of detailed information is an example of "second information" and "function information". The print capability information PI is an example of "capability information". The model name including the character string "V1" is an example of "predetermined model name" and "particular information". In the list screen SC1 and the accepting screen SC2A of FIG. 5, the character strings indicating the model name "V1-aaa", the printer type information "Laser" and the status information, and the character string for selecting the print condition, are examples of "first type of apparatus information". In the list screen SC1 and the accepting screen SC2B, the character strings indicating the model name "V2-bbb", the printer type information "Laser", and the status information, and the character string for selecting the print condition, are examples of "second type of apparatus information". The list screen and the accepting screen are examples of "selection screen".

Second Embodiment

In the first embodiment, as shown in S122 of FIG. 3, the portable terminal TE1 determines whether to send the SDReq of WFD by determining whether the SDRes of WFDS includes a model name including the character string "V1". By contrast, in the present embodiment, the printer PR1 sends, to the portable terminal TE1, a PRes including information indicating that it is capable of sending the second type of detailed information in accordance with the SD of WFDS (i.e., information indicating that it is capable of sending information unique to the vendor in accordance with the SD of WFDS; called "Enable information" below). Then, the portable terminal TE1 determines whether to send the SDReq of WFDS for inquiring the second type of detailed information by determining whether the Enable information has been received.

(Process of Printer PR1; FIG. 2)

In S12, the CPU 32 of the printer PR1 sends a PRes including the Enable information to the portable terminal. The Enable information is information described in a vendor extension region in the PRes. The vendor extension region is a region in which the vendor V1 of the printer PR1 can arbitrarily describe information. The portable terminal TE1 comprising the printer app 78 provided by the vendor V1 is capable of interpreting the information described in the vendor extension region. On the other hand, the portable terminal TE2 comprising the printer app 80 provided by the vendor V2, who is different from the vendor V1, is incapable of interpreting the information described in the vendor extension region. Moreover, each of the other printers PR2, PR3 sends, to the portable terminal, a PRes which does not include the Enable information.

In the present embodiment, S24 is not executed. Then, in S30, the CPU 32 monitors whether an SDReq of WFDS including information for inquiring the second type of detailed information has been received. The SDReq of WFDS received from the portable terminal TE1 in S30 includes information indicating the print service. Consequently, in S32 the CPU 32 can send an SDRes including the second type of detailed information related to the print service to the portable terminal TE1 without storing the MACt1 of the portable terminal TE1 and the print service in association with each other (i.e., without executing S24). However, in a modification, as in the first embodiment, S24 may be executed, and the SDReq of WFDS of S30 may not include information indicating the print service.

Figure 8:
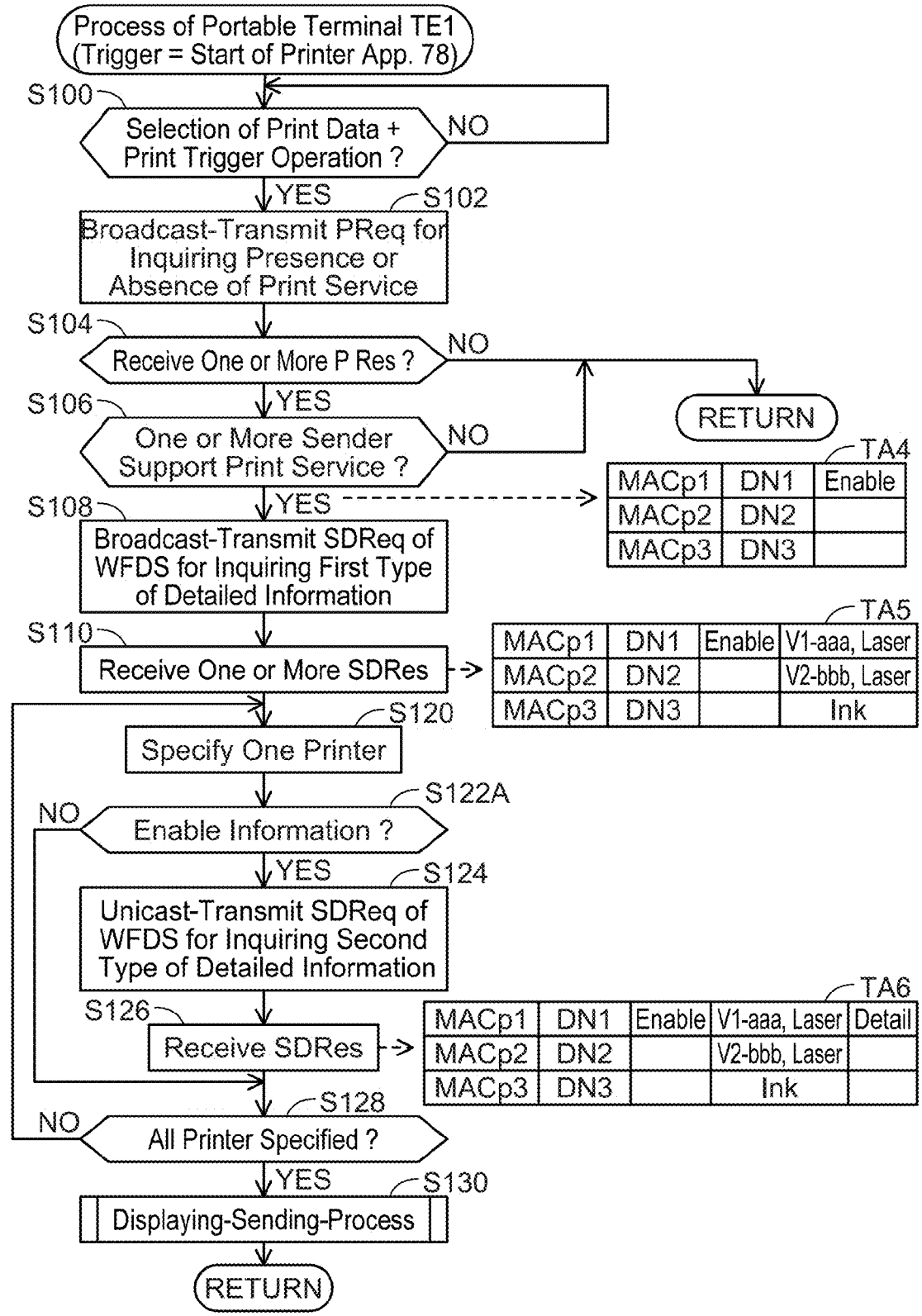
FIG. 8 shows a flowchart of a process executed by a portable terminal of a second embodiment.

(Process of Portable Terminal TE1; FIG. 8)

In the present embodiment, the CPU 72 of the portable terminal TE1 executes the process of FIG. 8 instead of the process of FIG. 3. S100 to S120 are the same as S110 to S120 of FIG. 3. However, in a case where the PRes received in S104 includes the Enable information, the CPU 72 stores the MAC address of the sender of the PRes and the Enable information in the memory 74 in association with each other. This is shown in tables TA4, TA5, TA6.

In S122A, the CPU 72 determines whether the Enable information is associated with the specified MAC address. In case of determining that the Enable information is associated (YES in S122A), i.e., in a case of determining that the specified printer is a printer produced by the predetermined vendor V1, the CPU 72 proceeds to S124. On the other hand, in case of determining that the Enable information is not associated (NO in S122A), i.e., in a case of determining that the specified printer is not a printer produced by the predetermined vendor V1, the CPU 72 skips S124 and S126, and proceeds to S128. In S124, the CPU 72 unicast-transmits not the SDReq of WFD, but the SDReq of WFDS including information for inquiring the second type of detailed information.

Figure 9:
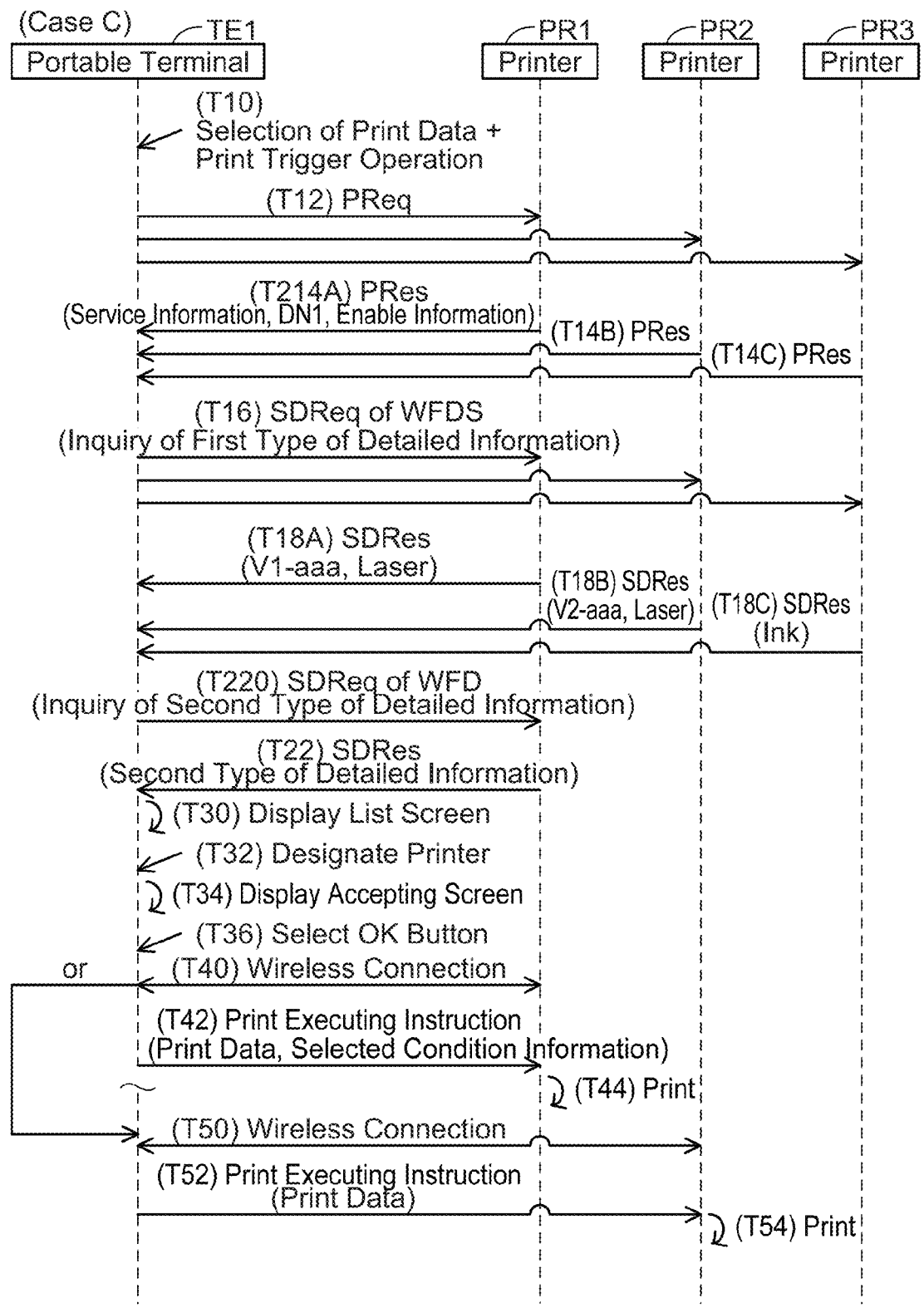
FIG. 9 shows a sequence view of a case C of the second embodiment.

(Case C; FIG. 9)

Next, a case C in which the portable terminal TE1 of the present embodiment causes the printer PR1 or the printer PR2 to execute a print will be described with reference to FIG. 9. Case C of FIG. 9 is basically the same as T10 to T54 of FIG. 6. However, in T214A, the printer PR1 sends a PRes including the Enable information to the portable terminal TE1 (S12 of FIG. 2). Further, the printer PR1 does not execute a process corresponding to T19 of FIG. 6. Further, in T220, the portable terminal TE1 sends, not the SDReq of WFD, but the SDReq of WFDS including information for inquiring the second type of detailed information, to the printer PR1 (S124 of FIG. 8).

In the present embodiment, also, it is possible to prevent execution of unnecessary communication between the portable terminal TE1 and each of the printers PR2, PR3 before a wireless connection between the portable terminal TE1 and the printers is established. In the present embodiment, the PReq, the PRes, the SDReq of WFDS for inquiring the first type of detailed information, the SDRes for responding to that SDReq, the SDReq of WFDS for inquiring the second type of detailed information, and the SDRes for responding to that SDReq are an example of "first inquiry signal", "first response signal", "fourth inquiry signal", "fourth response signal", "second inquiry signal" and "second response signal", respectively. Further, the Enable information is an example of "predetermined information".

(Modification 1) The portable terminal TE1 may omit S132 to S136 of FIG. 4, and may automatically select the printer PR1, which is the acquisition source of the second type of detailed information, from among the plurality of printers PR1 to PR3. In this case, the portable terminal TE1 may, e.g., automatically select a print condition within the range of the print capability information PI included in the second type of detailed information obtained from the printer PR1 and, in T152, may send a print executing instruction including the selected condition information to the printer PR1. In the present modification, the "display unit" may be omitted.

(Modification 2) The portable terminal TE1 displays the list screen of S132 of FIG. 4, but may not display the accepting screen of S134. That is, the portable terminal TE1 may not display the second type of detailed information. In this case, the model name of the printer PR1 that is the acquisition source of the second type of detailed information may be displayed by being emphasized in the list screen. Here, emphasized display includes, e.g., change of color, use of bolded letters, addition of a predetermined character, addition of a predetermined mark, graying out of other information, etc. In this case, e.g., in a case where the printer PR1 is selected by the user in the list screen, the portable terminal TE1 may automatically select the print condition within the range of the print capability information PI included in the second type of detailed information obtained from the printer PR1 and, in T152, send a print executing instruction including the selected condition information to the printer PR1.

(Modification 3) In the embodiments described above, inquiry of information is executed by using the PReq, the SDReq of WFDS, and the SDReq of WFD. However, the embodiments are not limited to these, and the technique described in the above embodiments can also be applied to other situations where a first inquiry and a second inquiry are executed sequentially. For example, the portable terminal TE1 may send a first inquiry signal different from the SDReq of WFDS or the PReq, and receive a first response signal from the printers PR1 to PR3. Each of the first response signals may include, e.g., the first type of detailed information related to the print function of each of the printers PR1 to PR3. Then, the portable terminal TE1 may determine, for each of the printers PR1 to PR3 based on the first type of detailed information obtained from the printer, whether the printer satisfies a predetermined condition. In this case, e.g., the following modification can be considered.

For example, in a case where the status information included in the first type of detailed information obtained from the printer indicates capable of executing the print function, the portable terminal TE1 may determine that the printer satisfies the predetermined condition, send a second inquiry signal different from the SDReq of WFD or the SDReq of WFDS to the printer, and receive a second response signal including the second type of detailed information (e.g., the print capability information PI) from the printer. On the other hand, in a case where the status information included in the first type of detailed information obtained from the printer indicates incapable of executing the print function, the portable terminal TE1 may determine that the printer does not satisfy the predetermined condition, and not send the second inquiry signal to the printer. In the present modification, the portable terminal TE1 may automatically select a printer which satisfies the predetermined condition from among the printers, and send the print executing instruction to the selected printer.

Further, e.g., in a case where the first type of detailed information obtained from the printer does not include sufficient information (e.g. the print capability information PI) for sending the print executing instruction, the portable terminal TE1 may determine that the printer satisfies the predetermined condition, send a second inquiry signal different from the SD of WFD or the SD of WFDS to the printer, and receive a second response signal including the second type of detailed information from the printer. On the other hand, in a case where the first type of detailed information obtained from the printer includes sufficient information for sending the print executing instruction, the portable terminal TE1 may determine that the printer satisfies the predetermined condition, and may not send a second inquiry signal to the printer. In the present modification, in a case where the information received from each printer is displayed, and selection of the printer by the user is accepted, the portable terminal TE1 may send the print executing instruction to the selected printer.

(Modification 4) In S134 of FIG. 4, when displaying the accepting screen SC2A corresponding to the printer PR1 (see FIG. 5), the portable terminal TE1 may not display the print condition (600 dpi, A4, Color, in the example of FIG. 4) indicated by the history information as the initial display information. In this case, the portable terminal TE1 may display all the print conditions (e.g., four print resolutions (1200 dpi, 600 dpi, etc.)) included in the print capability information PI, and display the print condition (e.g. 600 dpi) indicated by the history information in an emphasized manner using the method shown in modification 2. The present modification, also, is an example of "the function executing condition indicated by the history information is more preferentially displayed than another function executing condition".

(Modification 5) In S132 of FIG. 4, the portable terminal TE1 may not display the two list screens SC1A, SC1B (see FIG. 5), but may display the model name and device name of the printers PR1 to PR3 in one screen. In this case, the portable terminal TE1 may, e.g., display the model name of the printer PR1 more preferentially by displaying the model name of the printer PR1 above the model names and device names of the other printers PR2, PR3. Further, the portable terminal TE1 may, e.g., display the model name of the printer PR1 in an emphasized manner using the method shown in modification 2. The present modification, also, is an example of "the first type of apparatus information is more preferentially displayed than the second type of apparatus information".

(Modification 6) The second type of detailed information may not include the history information. Further, the second type of detailed information may not include the print capability information PI. Further, the second type of detailed information may not include the status information. In general terms, "second information" may not include at least one of the history information, the capability information, and the status information. Further, in another modification, the second type of detailed information may, e.g., not include any of the information described above, and may include the model name, the printer type information, etc. In general terms, "second information" may not include any of the history information, the capability information, and the status information, and may include another type of information.

(Modification 7) The "selection screen" may not be divided into the two types of screen, i.e., the list screen and the accepting screen, but may be one screen which includes both the contents of the list screen and the contents of the accepting screen.

(Modification 8) In the embodiments described above, the portable terminal TE1 establishes a wireless connection with a printer which does not belong to a wireless network but, in a case where a printer belonging to a wireless network (i.e., a printer operating as a G/O) is selected by the user, may establish a wireless connection with that printer. In this case, when executing a communication for establishing a wireless connection (S144 of FIG. 4), the portable terminal TE1 may not execute P2P Group Formation for determining the G/O.

(Modification 9) The "function executing apparatus" is not restricted to a printer, but may be a scanner capable of executing a scan function, a facsimile apparatus capable of executing a facsimile function, etc. In the present modification, the scan function, the facsimile function, etc. is an example of "particular function".

(Modification 10) In the above embodiments, the CPU 32 of the printer PR1 and the CPU 72 of the portable terminal TE1 realize the processes in FIG. 2 to FIG. 4 and FIG. 6 to FIG. 9 by executing processes in accordance with software. Instead, at least one process may be implemented by hardware such as a logic circuit.

What is claimed is:

1. A terminal apparatus comprising:
   a wireless interface for executing a wireless communication;
   a processor; and
   a memory storing computer-readable instructions therein, the computer-readable instructions, when executed by the processor, causing the terminal apparatus to perform:
   sending, before a wireless connection between the terminal apparatus and a target function executing apparatus via the wireless interface is established, a first inquiry signal to two or more function executing apparatuses;
   in response to sending the first inquiry signal, receiving a first response signal from each of the two or more function executing apparatuses, each first response signal including first information related to the function executing apparatus which is a sender of the first response signal;
   determining, for each of the two or more function executing apparatuses, whether the function executing apparatus is a first type of function executing apparatus or a second type of function executing apparatus based on the first response signal received from the function executing apparatus;
   sending, before the wireless connection between the terminal apparatus and the target function executing apparatus via the wireless interface is established, a second inquiry signal to each first type of function executing apparatus, wherein the second inquiry signal is not sent to each second type of function executing apparatus;
   in response to sending the second inquiry signal, receiving a second response signal from each first type of function executing apparatus, the second response signal including second information related to a particular function which the first type of function executing apparatus is capable of executing;
   selecting, before the wireless connection between the terminal apparatus and the target function executing apparatus via the wireless interface is established, the target function executing apparatus from among the two or more function executing apparatuses, by using at least the first information included in each first response signal received from the two or more function executing apparatuses and the second information included in each second response signal;
   establishing the wireless connection with the selected target function executing apparatus via the wireless interface; and
   sending an executing instruction to the target function executing apparatus via the wireless interface after the wireless connection with the target function executing apparatus is established, the executing instruction causing the target function executing apparatus to execute the particular function.

2. The terminal apparatus as in claim 1, wherein the computer-readable instructions, when executed by the processor, causing the terminal apparatus to further perform:
   selecting, before the wireless connection between the terminal apparatus and the target function executing apparatus via the wireless interface is established, a function executing condition for causing the target function executing apparatus to execute the particular function,
   wherein the executing instruction includes selected condition information indicating the selected function executing condition.

3. The terminal apparatus as in claim 1, wherein the computer-readable instructions, when executed by the processor, causing the terminal apparatus to further perform:
   causing a display unit to display a selection screen for causing a user to select, before the wireless connection between the terminal apparatus and the target function executing apparatus via the wireless interface is established, the target function executing apparatus from among the two or more function executing apparatuses,
   wherein in a case where both one or more first type of function executing apparatuses and one or more second type of function executing apparatuses exist in the two or more function executing apparatuses, the selection screen includes first type of apparatus information corresponding to each of the one or more first type of function executing apparatuses and second type of apparatus information corresponding to each of the one or more second type of function executing apparatuses,
   the first type of apparatus information includes the second information included in the second response signal received from each of the one or more first type of function executing apparatuses,
   the second type of apparatus information does not include the second information, and
   the target function executing apparatus is selected from among the two or more function executing apparatuses in response to accepting a selection of the target function executing apparatus from the user on the selection screen.

4. The terminal apparatus as in claim 3, wherein the selection screen is for causing the user to select, before the wireless connection between the terminal apparatus and the target function executing apparatus via the wireless interface is established, a function executing condition for causing the target function executing apparatus to execute the particular function.

5. The terminal apparatus as in claim 3, wherein
the second information includes capability information indicating capability of the particular function which the first type of function executing apparatus is capable of executing, and
in a case where the first type of function executing apparatus is selected as the target function executing apparatus by the user and a function executing condition is selected by the user based on the capability information, the executing instruction includes selected condition information indicating the selected function executing condition.

6. The terminal apparatus as in claim 5, wherein
the second information further includes history information indicating a function executing condition which was used by the first type of function executing apparatus when the first type of function executing apparatus executed the particular function in response to previously receiving a function executing instruction from the terminal apparatus, and
in a case where the one or more first type of function executing apparatuses exist in the two or more function executing apparatuses, the selection screen includes the first type of apparatus information such that the function executing condition indicated by the history information is more preferentially displayed than another function executing condition.

7. The terminal apparatus as in claim 3, wherein in a case where both the one or more first type of function executing apparatuses and the one or more second type of function executing apparatuses exist in the two or more function executing apparatuses, the selection screen includes both the first type of apparatus information and the second type of apparatus information such that the first type of apparatus information is more preferentially displayed than the second type of apparatus information.

8. The terminal apparatus as in claim 3, wherein the computer-readable instructions, when executed by the processor, causing the terminal apparatus to further perform:
sending, before the first inquiry signal is sent to the two or more function executing apparatuses, a third inquiry signal to the two or more function executing apparatuses; and
in response to sending the third inquiry signal, receiving, from each of the two or more function executing apparatuses, a third response signal including a device name of the function executing apparatus,
wherein in a case where the one or more first type of function executing apparatuses exist in the two or more function executing apparatuses and the first information included in one or more first response signals received from the one or more first type of function executing apparatuses includes one or more model names of the one or more first type of function executing apparatuses, the first type of apparatus information includes the one or more model names of the one or more first type of function executing apparatuses and the second information included in one or more second response signals received from the one or more first type of function executing apparatuses,
in a case where the one or more second type of function executing apparatus exist in the two or more function executing apparatuses and each of the first information included in one or more first response signals received from the one or more second type of function executing apparatuses includes a model name of the second type of function executing apparatus, each of the second type of apparatus information includes the model name of the second type of function executing apparatus, and
in a case where the one or more second type of function executing apparatuses exist in the two or more function executing apparatuses and each of the first information included in one or more first response signals received from the one or more second type of function executing apparatuses does not include a model name of the second type of function executing apparatus, each of the second type of apparatus information includes a device name included in the third response signal received from the second type of function executing apparatus.

9. The terminal apparatus as in claim 3, wherein
the first response signal includes a device name of the sender,
the computer-readable instructions, when executed by the processor, causing the terminal apparatus to further perform:
sending, before the wireless connection between the terminal apparatus and the target function executing apparatus via the wireless interface is established and after the first inquiry signal is sent, a particular inquiry signal to the two or more function executing apparatuses; and
in response to sending the particular inquiry signal, receiving, from each of the two or more function executing apparatuses, a particular response signal including a model name of the function executing apparatus,
wherein in a case where the one or more first type of function executing apparatuses exist in the two or more function executing apparatuses and the one or more particular response signals received from the one or more first type of function executing apparatuses include one or more model names of the one or more first type of function executing apparatuses, the first type of apparatus information includes the one or more model names of the one or more first type of function executing apparatuses and the second information included in each second response signal received from the one or more first type of function executing apparatuses,
in a case where the one or more second type of function executing apparatuses exist in the two or more function executing apparatuses and each of the one or more particular response signals received from the one or more second type of function executing apparatuses includes a model name of the second type of function executing apparatus, the second type of apparatus information includes the one or more model names of the one or more second type of function executing apparatuses, and
in a case where the one or more second type of function executing apparatuses exist in the two or more function executing apparatuses and each of the one or more particular response signals received from the one or more second type of function executing apparatuses does not include a model name of the second type of function executing apparatus, the second type of apparatus information includes one or more device names included in one or more first response signals received from the one or more second type of function executing apparatuses.

10. The terminal apparatus as in claim 1, wherein
in a case where the first information included in the first response signal includes model name of the sender of the first response signal and the model name is a predetermined model name, determining that the sender is the first type of function executing apparatus,
in a case where the first information included in the first response signal includes a model name of the sender of the first response signal and the model name is not the predetermined model name, determining that the sender is the second type of function executing apparatus, and
in a case where the first information included in the first response signal does not include a model name of the sender of the first response signal, determining that the sender is the second type of function executing apparatus.

11. The terminal apparatus as in claim 1, wherein
the first inquiry signal is a Service Discovery Request signal in accordance with Wi-Fi Direct Services, and
the second inquiry signal is a Service Discovery Request signal in accordance with Wi-Fi Direct.

12. The terminal apparatus as in claim 1, wherein
in a case where the first information included in the first response signal includes sender-capable-information indicating that a sender is capable of sending the second information, determining that the sender is the first type of function executing apparatus, and
in a case where the first information included in the first response signal does not include the sender-capable-information, determining that the sender is the second type of function executing apparatus.

13. The terminal apparatus as in claim 1, wherein
the first inquiry signal is a Probe Request signal, and
the second inquiry signal is a Service Discovery Request signal in accordance with Wi-Fi Direct Services.

14. The terminal apparatus as in claim 1, wherein
in a case where the first information included in the first response signal includes particular information indicating that a sender is an apparatus produced by a predetermined vender, determining that the sender is the first type of function executing apparatus, and
in a case where the first information included in the first response signal does not include the particular information, determining that the sender is the second type of function executing apparatus.

15. The terminal apparatus as in claim 1, wherein the second information includes status information indicating a current status of the first type of function executing apparatus.

16. The terminal apparatus as in claim 1, wherein
the first inquiry signal is sent without using a communication layer of an internet layer of a TCP/IP model and above the internet layer of the TCP/IP model,
the second inquiry signal is sent without using a communication layer of the internet layer of the TCP/IP model and above the internet layer of the TCP/IP model, and
the executing instruction is sent using a communication layer of the internet layer of the TCP/IP model or above the internet layer of the TCP/IP model.

17. A non-transitory computer-readable storage medium storing computer-readable instructions for a terminal apparatus, wherein the computer-readable instructions, when executed by a processor of the terminal apparatus, cause the terminal apparatus to perform:
sending, before a wireless connection between the terminal apparatus and a target function executing apparatus via a wireless interface of the terminal apparatus is established, a first inquiry signal to two or more function executing apparatuses;
in response to sending the first inquiry signal, receiving a first response signal from each of the two or more function executing apparatuses, each first response signal including first information related to the function executing apparatus which is a sender of the first response signal;
determining, for each of the two or more function executing apparatuses, whether the function executing apparatus is a first type of function executing apparatus or a second type of function executing apparatus based on the first response signal received from the function executing apparatus;
sending, before the wireless connection between the terminal apparatus and the target function executing apparatus via the wireless interface is established, a second inquiry signal to each first type of function executing apparatus, wherein the second inquiry signal is not sent to each second type of function executing apparatus;
in response to sending the second inquiry signal, receiving a second response signal from each first type of function executing apparatus, the second response signal including second information related to a particular function which the first type of function executing apparatus is capable of executing;
selecting, before the wireless connection between the terminal apparatus and the target function executing apparatus via the wireless interface is established, the target function executing apparatus from among the two or more function executing apparatuses, by using at least the first information included in each first response signal received from the two or more function executing apparatuses and the second information included in each second response signal;
establishing the wireless connection with the selected target function executing apparatus via the wireless interface; and
sending an executing instruction to the target function executing apparatus via the wireless interface after the wireless connection with the target function executing apparatus is established, the executing instruction causing the target function executing apparatus to execute the particular function.

18. A function executing apparatus comprising:
a function executing engine for executing a particular function;
a wireless interface for executing a wireless communication;
a processor; and
a memory storing computer-readable instructions therein, the computer-readable instructions, when executed by the processor, causing the function executing apparatus to perform:
receiving, before a wireless connection between a terminal apparatus and the function executing apparatus via the wireless interface is established, a first inquiry signal from the terminal apparatus via the wireless interface;

in response to receiving the first inquiry signal, sending a first response signal to the terminal apparatus via the wireless interface, the first response signal including particular information indicating that the function executing apparatus satisfies a predetermined condition;

receiving a second inquiry signal from a first type of terminal apparatus via the wireless interface in a case where the terminal apparatus is the first type of terminal apparatus which is capable of obtaining function information related to the particular function from the function executing apparatus which satisfies the predetermined condition, wherein the second inquiry signal is not received from a second type of terminal apparatus, in a case where the terminal apparatus is the second type of terminal apparatus which is not capable of obtaining the function information from the function executing apparatus which satisfies the predetermined condition;

in response to receiving the second inquiry signal, sending a second response signal including the function information to the first type of terminal apparatus via the wireless interface;

establishing a wireless connection with the first type of terminal apparatus in a case where a trigger signal for establishing the wireless connection is received from the first type of terminal apparatus via the wireless interface;

establishing a wireless connection with the second type of terminal apparatus in a case where the trigger signal is received from the second type of terminal apparatus via the wireless interface;

receiving a first function executing instruction from the first type of terminal apparatus via the wireless interface after the wireless connection with the first type of terminal apparatus is established;

receiving a second function executing instruction from the second type of terminal apparatus via the wireless interface after the wireless connection with the second type of terminal apparatus is established;

causing the function executing engine to execute the particular function in a case where the first function executing instruction is received from the first type of terminal apparatus; and causing the function executing engine to execute the particular function in a case where the second function executing instruction is received from the second type of terminal apparatus.

* * * * *